United States Patent
Cui et al.

(10) Patent No.: US 12,323,897 B2
(45) Date of Patent: Jun. 3, 2025

(54) CONNECTIONLESS MOBILITY MANAGEMENT FOR HYBRID NETWORKS USING RELATIVISTIC ROUTING PROTOCOL

(71) Applicant: AT&T Intellectual Property I, L.P., Atlanta, GA (US)

(72) Inventors: Zhi Cui, Sugar Hill, GA (US); Hongyan Lei, Plano, TX (US); John Bartell, Alpharetta, GA (US); Paul Smith, Jr., Heath, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 512 days.

(21) Appl. No.: 17/661,102

(22) Filed: Apr. 28, 2022

(65) Prior Publication Data
US 2023/0354147 A1    Nov. 2, 2023

(51) Int. Cl.
*H04W 40/12* (2009.01)
*H04W 40/24* (2009.01)
*H04W 40/36* (2009.01)

(52) U.S. Cl.
CPC ......... *H04W 40/12* (2013.01); *H04W 40/246* (2013.01); *H04W 40/248* (2013.01); *H04W 40/36* (2013.01)

(58) Field of Classification Search
CPC . H04W 40/12; H04W 40/246; H04W 40/248; H04W 40/36

USPC .......................................................... 370/329
See application file for complete search history.

(56) References Cited

U.S. PATENT DOCUMENTS

| | | | |
|---|---|---|---|
| 6,894,994 B1* | 5/2005 | Grob ................... | H04B 1/7103 370/335 |
| 2017/0230287 A1* | 8/2017 | Hall ....................... | H04L 69/22 |
| 2019/0132784 A1* | 5/2019 | Thubert .............. | H04W 72/044 |

* cited by examiner

*Primary Examiner* — Rownak Islam
(74) *Attorney, Agent, or Firm* — Guntin & Gust, PLC; Dana Lemoine

(57) ABSTRACT

Connectionless mobility management techniques across different wireless technologies are provided. In an embodiment, a method comprises obtaining, by a controller device that comprises a processor and that is part of a communication network employing a relativistic routing protocol (RRP), condition information regarding operating conditions associated with different access point devices, wherein the communication network comprises router agent devices respectively connected to the different access point devices that communicatively couple the different access point devices to a server device via respective communication links to a router device. The method further comprises determining, by the controller device based on the operating condition information, an assignment of the different access point devices to mobile devices for usage as serving nodes for the mobile devices, and controlling, by the controller device, latency settings of the respective communication links for the mobile devices based on the assignment.

20 Claims, 11 Drawing Sheets

CONNECTIONLESS MOBILITY MANAGEMENT FOR HYBRID NETWORKS USING RELATIVISTIC ROUTING PROTOCOL

TECHNICAL FIELD

This disclosure relates generally to mobility management across different wireless technologies using connectionless principle and Relativistic Routing Protocol (RRP).

BACKGROUND

Mobile traffic has been growing at a very fast pace. In addition, the variation of different types of end points, the variation of applications, and the variation in the mobility states of the user equipment UE (e.g., whether a UE is moving, and how fast) is growing and continues to evolve. Due to the amount of signaling overhead associated with general packet radio service (GPRS) tunneling protocol (GTP) connection setup/tear down requirements for mobility handovers, Traditional Third Generation Partnership Project (3GPP) tunnel/bearer-based connection-oriented architectures will not scale cost effectively for future mobility networks which will include various types of end devices such as extended reality (XR) devices, smart devices, and billions of Internet of Things (IoT) devices. To efficiently support the future billions of end devices and simplify the mobility process, an efficient connectionless architecture is needed instead of a connection-oriented architecture that requires setting up GTP tunneling before any data path communications.

The above-described description is merely intended to provide a contextual overview regarding wireless communication system mobility management, and is not intended to be exhaustive.

DETAILED DESCRIPTION

Figure 1:
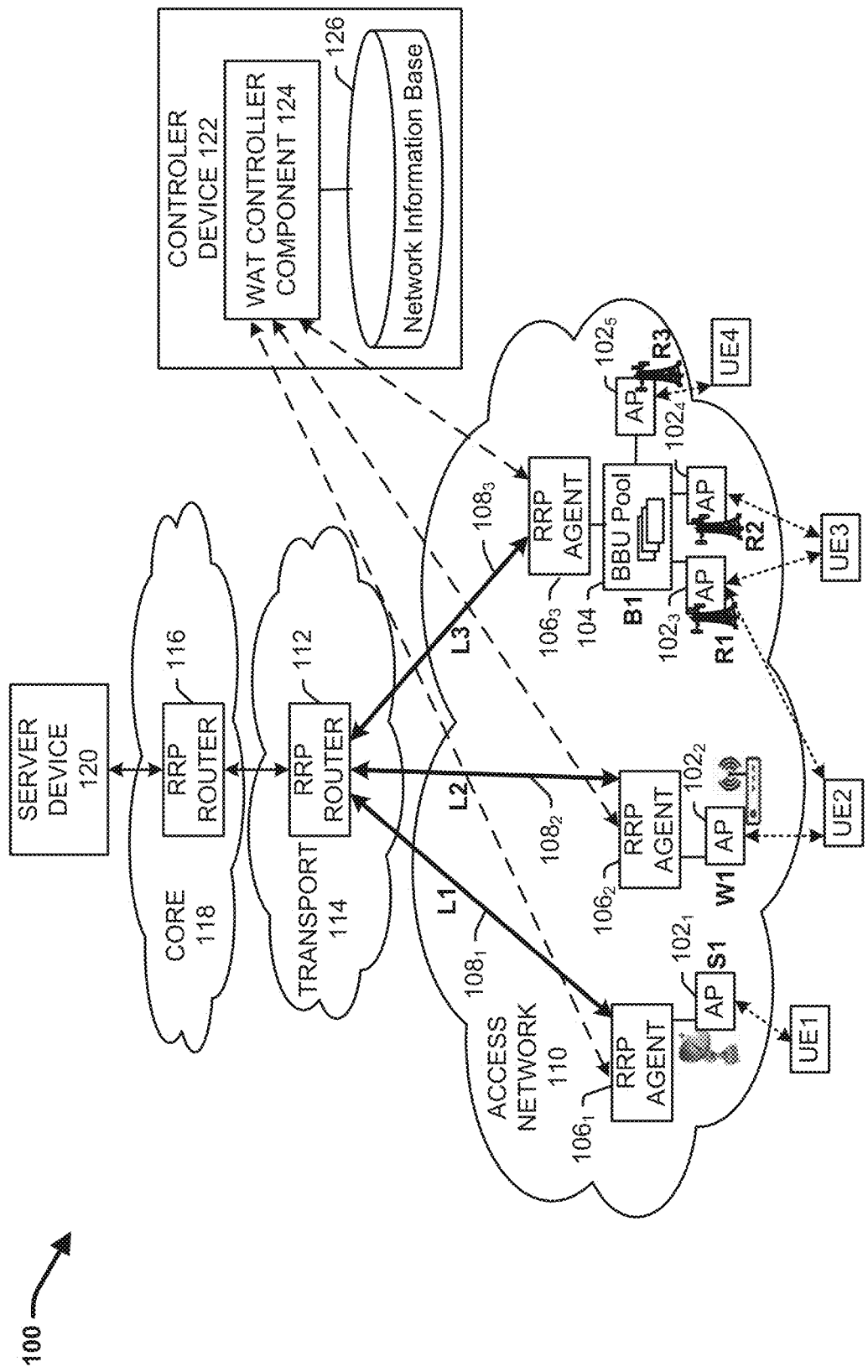
FIG. 1 illustrates an example communication system that facilitates connectionless mobility management for hybrid networks using a Relativistic Routing Protocol (RRP), in accordance with various aspects and embodiments of the disclosed subject matter.

The following detailed description is merely illustrative and is not intended to limit embodiments and/or application or uses of embodiments. Discussed herein are various aspects and embodiments that relate to a simple mobility management across different wireless communication technologies (e.g., Long Term Evolution (LTE), Wi-Fi, 3GGP, 5G, satellite, etc., and any future access technologies) by using a connectionless architecture and a relativistic routing protocol (RRP). The connectionless architecture differs from the traditional 3GPP connection-oriented architecture in that the connectionless architecture does not require setting up GTP tunneling before any data path communications are enabled. This connectionless architecture is facilitated via the RRP. RRP is a novel routing protocol that employs Internet Protocol (IP) based communication channels instead of special purpose tunnels/bearers. RRP seeks to minimize overall latency in a network and in doing so also exploits a higher level of overall network efficiency than most current routing protocols would achieve.

The disclosed techniques further enable multiple, simultaneous active connections to a given UE across different wireless technologies to ensure reliable and optimal wireless connectivity's to the UE. In addition, the disclosed mobility management techniques enable quick handovers or switchovers to best communication path for a given UE due to the elimination of GTP tunneling setup and tear down requirements. As a result, wireless communication networks can be simplified, made more reliable, and will become easier to manage. The disclosed techniques further reduce UE complexity and improve UE battery life using simple IP based communication channels instead of special purpose tunnels/bearers.

To facilitate this end, one or more embodiments of the disclosed subject matter provide a communication network that employs a RRP system and corresponding RRP that frequently identifies and distributes among routers, useful information about network and UE conditions to facilitate improved routing among multiple devices. The RRP system comprises dedicated router agents (referred to herein as RRP agents) at respective access points (APs) of the communication network, one or more router nodes in the network transport and core layers (referred to herein as RRP router nodes) and a wireless access technology (WAT) controller. The APs can include a variety of different types of AP devices that employ essentially any type of wireless communication technology to connect a UE to another network node of the communication network, such as cellular APs, Wi-Fi APs, satellite APs and any future access technologies. The respective RRP agents are further communicatively coupled to the communication network server via respective communication links or channels to the one or more RRP router nodes in the network transport and/or core layers. The RRP agents further manage and control communication data traffic to and from their respective APs and their connected UEs via their corresponding communication links or channels to the one or more RRP router nodes in the network transport and/or core layers. These communication links or channels can comprise IP-based communication channels instead of special purpose tunnels/bearers. In this regard, the RRP agents and the RRP router nodes can process and communicate IP data packets between one another for respective UEs in accordance with a desired IP or other communication network protocols (e.g., an Internet protocol suite, such as transmission control protocol (TCP)/IP). The respective APs can further relay the data traffic to their connected UEs using their underlying communication technology, which can vary as noted above.

Each of the RRP agents of the respective APs are further communicatively coupled to the WAT controller. The WAT controller receives and monitors condition information regarding current operating conditions associated with different APs and UEs, such as but not limited to, current load, coverage, UEs connected thereto, and relevant information for the respective UEs (e.g., mobility status, UE type, application usage, etc.). Based on the received condition information (and in some implementations network policy information), the WAT controller determines an assignment of the different AP to the UEs for usage as serving nodes for the UEs. In this regard, assignment of an AP to a UE as a serving node means the communication link between that APs' RRP agent and the RRP router node will be used as an active serving link for the UE. The WAT controller further controls setting of latency requirements of the respective communication links for usage by the UEs based on the assignment. In particular, the WAT controller notifies and instructs the RRP agents regarding how to set the uplink and downlink latency settings of their communication links to make them active or inactive for usage by their connected UEs based on the assignment. For example, the WAT controller can instruct the RRP agents to set the uplink and downlink latency values of their communication links to a useful value (e.g., 1.0 millisecond or another low latency value) to make them active for a given UE or to a non-useful value (e.g., infinity) to make them inactive for a given UE. In this regard, as a mobile UE moves about the network, the UE can maintain active connections with two or more different APs at any given time. The WAT controller can further dynamically determine the best AP among the different AP to which the UE is connected to be the current serving node for that UE based on the respective conditions at the APs (e.g., current load), the relative position of the UE to the respective APs, quality of the respective links between the UE and the respective APs, the mobility state of the UE, network policies and other factors.

The respective RRP agents maintain and update routing tables with information regarding the states of the UEs connected to their corresponding APs, including information regarding the current uplink (and optionally downlink) latency settings for usage (or non-usage) of their corresponding communication links by their connected UEs. In some embodiments, the RRP agents can further determine and set the latency values for the respective UEs based on the instructions received from the WAT controller (regarding whether the link should be an active serving link or not, as well as handover routing instructions) and current load conditions of their APs.

The RRP agents communicate the uplink data packets to the RRP router nodes according to the uplink latency settings per UE, and the one or more RRP router nodes in the network transport and/or core layers communicate the downlink data packets to the RRP agents according to the downlink settings per UE. In one or more embodiments, once determined based on the instructions provided by the WAT controller, the RRP agents can notify and instruct the RRP router nodes regarding the respective serving links and associated downlink settings to be used by the RRP router nodes for the respective UEs. The RRP router nodes can further maintain and update routing tables with information regarding the serving links for the respective UEs and the downlink latencies to be applied. The RRP router nodes can further manage and control downlink packet forwarding from a previous serving AP to a new serving AP for a UE during handover procedures in accordance with the RRP to ensure zero packet loss during handovers.

In some embodiments, the non-limiting term radio network node or simply network node, radio network device or simply network device and network equipment are used herein. These terms may be used interchangeably, and refer to any type of network node that can serve a UE and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), transmission points, transmission nodes, radio resource unit (RRU), remote radio head (RRH), nodes in distributed antenna system (DAS), etc.

The term access point (AP), AP device, access node or the like are used herein interchangeably to refer to any type of network node that can serve a UE and be connected the RRP system of a wireless communication network as disclosed herein. As noted above, the disclosed wireless communication systems can employ a variety of different types of APs that employ different type of wireless communication access technologies, including cellular, Wi Fi, satellite, and future access technologies. In this regard, the different types of wireless communication access technologies can include, but are not limited to: new radio, LTE, 2G, 3G, 4G, 5G, UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies and satellite communication technologies. Further, the various aspects can be utilized with any Radio Access Technology (RAT) or multi-RAT system where the mobile device operates using multiple carriers (e.g., LTE Frequency Division Duplexing (FDD)/Time-Division Duplexing (TDD), Wideband Code Division Multiplexing Access (WCMDA)/HSPA, Global System for Mobile Communications (GSM)/GSM EDGE Radio Access Network (GERAN), Wi Fi, Wireless Local Area Network (WLAN), WiMax, CDMA2000, and so on).

In some embodiments, the non-limiting term user equipment (UE) is used. It can refer to any type of communication device that communicates with and connects to (or attempts to connect to) an AP of communication system. A UE also can be referred to for example as, communication device, a device, a mobile device, or a mobile communication device. The term communication device can be interchangeable with (or include) a UE or other terminology. Examples of UE can include, but are not limited to, a computer (e.g., a desktop computer, a laptop computer, laptop embedded equipment (LEE), laptop mounted equipment (LME), or other type of computer), a mobile terminal, a cellular and/or smart phone, a tablet or pad (e.g., an electronic tablet or pad), an electronic notebook, an electronic gaming device, electronic eyeglasses, headwear, or bodywear (e.g., electronic or smart eyeglasses, headwear (e.g., augmented reality (AR) or virtual reality (VR) headset), or bodywear (e.g., electronic or smart watch) having wireless communication functionality), a set-top box, an IP television (IPTV), a device to device (D2D) UE, a machine type UE or a UE capable of machine to machine (M2M) communication, a Personal Digital Assistant (PDA), a smart meter (e.g., a smart utility meter), a target device, devices and/or sensors that can monitor or sense conditions (e.g., health-related devices or sensors, such as heart monitors, blood pressure monitors, blood sugar monitors, health emergency detection and/or notification devices, or other type of device or sensor), a broadband communication device (e.g., a wireless, mobile, and/or residential broadband communication device, transceiver, gateway, and/or router), a dongle (e.g., a Universal Serial Bus (USB) dongle), a music or media player, speakers (e.g., powered speakers having wireless communication functionality), an appliance (e.g., a toaster, a coffee maker, a refrigerator, or an oven, or other type of appliance having wireless communication functionality), a device associated or integrated with a vehicle (e.g., automobile, airplane, bus, train, or ship, or other type of vehicle), a virtual assistant (VA) device, a drone, a home or building automation device (e.g., security device, climate control device, lighting control device, or other type of home or building automation device), an industrial or manufacturing related device, a farming or livestock ranch related device, and/or any other type of communication devices (e.g., other types of IoTs). Various embodiments of the disclosed subject matter are directed to managing and optimizing connections of mobile devices as the move about a communication network. To this end, the term mobile UE, mobile device, or the like is used herein to explicitly refer to a UE that has mobility capabilities as opposed to a device designed to remain stationary.

In some embodiments, the non-limiting term router, routing device, router device, routing agent, or router agent is used. These term can refer to any type of electronic device that can facilitate the connection of one or more nodes to a network, and between two or more nodes in the network, e.g., including, but not limited to, a general computer that has been configured to perform network routing functions. It should further be noted that, one or more embodiments used in examples herein utilize RRP routers/agents that employ a RRP to facilitate multiple (e.g., two or more) connections for a give UE across different wireless communication access technologies on a connectionless architecture.

Relativistic routing protocol (RRP) is novel routing protocol designed to deliver IP packets with the lowest latency and the highest probability of delivery. It accomplishes these goals using very small queues and manages them very carefully. Routers in an RRP network cooperate more intensely than that is typical with other routing protocols, and this enables very powerful features, including those described herein. The RRP network has very tight control loops, monitors link state and metadata, and develops a distributed graph for optimal packet delivery, behaving like a multi-RAT scheduler. RRP is a stateless routing method that supports generalized network configurations that include ring, star, mesh, and linear. The protocols are designed to allow end user connections at higher layers (like TCP) to function optimally and without any changes. Additional information regarding RRP and RRP networks is disclosed in U.S. Pat. Nos. 11,071,041, 11,240,730 and 11,190,457, the entirety of which are incorporate herein by reference.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

FIG. 1 illustrates a block diagram of an example communication system (hereinafter system 100) that facilitates connectionless mobility management for hybrid networks using a RRP. The system 100 comprises a distributed network architecture including network devices distributed between an access network layer 110, a transport layer 114, and a network core layer 118. The access network layer 110 can include a plurality of different AP devices via which UEs (e.g., UE1, UE2, UE3, UE4, and additional UEs) can attach or connect to using their respective access technologies. In the embodiment shown, these APs include AP $102_1$, AP $102_2$, AP $102_3$, AP $102_4$ and AP $102_5$. It should be appreciated that five example APs are illustrated for brevity and that in practice, the number of APs in the access network layer 110 can vary and include hundreds, thousands, millions, etc., of APs depending on the geographical area defined by the access network 110. It should also be appreciated that four UEs (e.g., UE1, UE2, UE3, UE4) are illustrated or brevity and that in paracticy, the number of UEs can include hundreds, thousands, millions, billions, etc., of UEs.

The APs included in the access network layer 110 can include a variety of different types of APs that employ different types of wireless communication technologies (e.g., satellite, mobile, cellular, 3G, 4G, 5G, LTE, and future wireless communication technologies) to communicate data traffic between the UEs connected thereto. For example, in the embodiment shown, AP $102_1$ corresponds to a satellite network AP (also referred to as satellite 1 or simply S1), AP $102_2$ corresponds to a WiFi access point (also referred to as WiFi 1 or simply W1), and APs $102_{3-5}$ correspond to cellular network towers, typically referred to as remote radio units (Reruns) or base stations (and also referred to in system 100 as R1, R2 and R3 respectively for brevity). It should be appreciated that these three types of APs are merely exemplary and the APs in the access network layer 110 can include various other types of APs that employ additional or alternative types of wireless access communication technologies. Further, it should be appreciated that APs can include a plurality of APs of the same type (e.g., a plurality of satellite APs, a plurality of WiFi APs, a plurality of cellular network APs, etc.).

Depending on the type of the APs, the APs may be standalone AP devices or part of separate communication networks (e.g., satellite communication networks, mobile communication networks, cellular communication networks, multi-carrier communication networks, etc.). For example, in the embodiment shown, APs $102_{3\text{-}5}$ (e.g., R1, R2 and R3) correspond to RRUs (also referred to as base stations) of a cellular communication network that employs a RAN architecture. The cellular communication network can correspond to a 5G network, an LTE network, a 3G network or another type of cellular technology communication network. The RAN can comprise various network components or devices, which can include one or more RANs (not explicitly shown in FIG. 1), wherein each RAN can comprise or be associated with a set of base stations (e.g., APs $102_{3\text{-}5}$) located in respective coverage areas served by the respective base stations. The respective base stations (e.g., APs $102_{3\text{-}5}$) can be associated with one or more sectors (not shown), wherein respective sectors can comprise respective cells. The cells can have respective coverage areas that can form the coverage area covered by the one or more sectors. UEs (e.g., UE3 and UE4 for example) can be communicatively connected to the cellular communication network via respective wireless communication connections with one or more of the base stations (APs $102_{3\text{-}5}$).

In some embodiments, the one or more RANs can be based on open-RAN (O-RAN) technology and standards. These standards can define the open interface that can support interoperability of network elements (e.g., radio unit (RU), central unit (CU), distributed unit (DU), real or near real time RAN intelligent controller (RIC), or other types of network elements from different entities (e.g., vendors). The network elements may be virtualized, e.g., software-based components that can run on a common virtualization/cloud platform. In certain embodiments, the O-RAN based RAN can utilize a common platform that can reduce reliance on proprietary platforms of service providers. The O-RAN based RAN also can employ standardized interfaces and application programming interfaces (APIs) to facilitate open source implementation of the O-RAN based RAN.

In some embodiments (and as illustrated in FIG. 1) the one or more RANs can be a cloud-based radio access network (C-RAN). A C-RAN is a deployment paradigm that seeks to isolate baseband unit (BBU) from its remote radio unit (RRU) in base station (BS), consolidating the BBUs into a common place (i.e., BBU pool 104). In the BBU pool 104, the computing resources provided by the BBUs can be dynamically assigned to RRUs on demand by the BBU controller (not shown). Thus, with the fluctuation of data traffic from RRUs, a part of BBUs can be dynamically turned on or off.

Regardless of the type of communication technology employed by the respective APs in the access network layer 110, the respective APs can be communicatively coupled to a server device 120 of the communication system 100 via an RRP routing system of the communication system 100. The server device 120 corresponds to one or more service provider servers that facilitate provision of applications and associated services to the UEs and/or facilitate communication between the UEs (e.g., UEs 1-4 and additional UEs) and other devices of the communication network 100. The applications and services can relate to, for example, video streaming, video calls, video content, audio streaming, audio calls, audio content, electronic gaming, text messaging, multimedia messaging, emails, website content, medical information (e.g., medical information from wireless medical devices associated with users), utility information (e.g., utility information from smart meters), emergency-related information, military-related information, law enforcement-related information, fire response services-related information, disaster response services-related information, and/or other desired types of information, content, or activities. In accordance with communication system 100, UEs can connect to and communicate with the server device 120 to receive and employ the corresponding applications and services using the APs in the access network layer 110, the RRP system and the associated connections and data paths, as described in greater detail below.

The RRP system comprises RRP agents (e.g., RRP agents $106_{1\text{-}3}$) in the access network layer 110, an RRP router 112 in the transport layer 114, an RRP router 116 in the core layer 118, and a wireless access technology (WAT) controller component 124. The respective RRP agents $106_{1\text{-}3}$, the RRP router 112 and the RRP router 116 can communicate or facilitate communication of data traffic for the UEs (e.g., UE1, UE2, UE3, UE4, and the like) between one another (and the server device 120) using RRP over IP-based wireless communication channels. In particular, each RRP agent in the access network 110 is communicatively coupled to the RRP router 112 via a separate wireless communication link or channel. For example, RRP agent $106_1$ is communicatively coupled to RRP router 112 via communication link $108_1$ (also referred to as link 1 or simply L1), RRP agent $106_2$ is communicatively coupled to RRP router 112 via communication link $108_2$ (also referred to as link 2 or simply L2), and RRP agent $106_3$ is communicatively coupled to RRP router 112 via communication link $108_3$ (also referred to as link 3 or simply L3). The RRP router 112, the RRP router 116 and the server device 120 are further communicatively coupled to one another via respective wireless communication channels. The RRP agents $106_{1\text{-}3}$, the RRP router 112 and the RRP router 116 can comprise suitable communication hardware and/or software that can be used by the respective network elements to communicate or facilitate communication of IP data traffic between one another.

In some embodiments, each AP in the access network 110 can be communicatively coupled to a dedicated RRP agent. For example, as illustrated in FIG. 1, AP $102_1$ is connected to RRP agent $106_1$ and AP $102_2$ is connected to RRP Agent $106_2$. In other embodiments with respect to cellular communication access networks comprising a RAN architecture, a single RRP agent can be used for all base stations included in a RAN, as illustrated in FIG. 1. For example, in the embodiment shown, RRP agent $106_3$ can be communicatively coupled to each of the respective base stations (e.g., APs $102_{3\text{-}5}$) via the BBU pool 104. With these embodiments, the RRP agent $106_3$ can communicatively couple all network devices associated with the RAN via its communication link (L3) to the RRP router 112. In other embodiments, a separate RRP agent can be deployed for each base station (e.g., each of APs $102_{3\text{-}5}$). Other deployment architectures are envisioned.

The RRP agent for each AP (or group of APs included in a RAN such as APs $102_{3\text{-}5}$) handles communication of all data traffic for its associated AP (or group of APs) over its corresponding communication link to the RRP router 112. For example, RRP agent $106_1$ can handle routing of uplink data received at AP $102_1$ for any UE connected to AP $102_1$ over L1 to the RRR router 112, and further handle routing downlink data received from the RRP router 112 over L1 for the connected UEs back to AP $102_1$. Similarly, RRP agent $106_2$ can handle routing of uplink data received at AP $102_2$ for any UE connected to AP $102_2$ over L2 to the RRR router 112, and further handle routing downlink data received from the RRP router 112 over L2 for the connected UEs back to AP $102_2$. Further, RRP agent $106_3$ can handle routing of uplink data received at APs $102_{3\text{-}5}$ for any UE connected to AP $102_{3\text{-}5}$ over L3 to the RRR router 112, and further handle routing downlink data received from the RRP router 112 over L3 for the connected UEs back to APs $102_{3\text{-}5}$. In this regard, assuming a hypothetical UE is capable of communicating data in any wireless communication technology employed by any of the APs in the access network layer 110, the UE can connect to any AP in the access network 110 using its corresponding wireless communication technology. Once connected, the UE communicates data traffic to and from the connected AP using the corresponding wireless communication technology employed by the AP. The RRP agent for that AP further relays the data traffic to and from the RRP router 112 via its corresponding link to the RRP router 112 using the RRP. As noted above, the RRP comprises an IP-based communication technology. In this regard, the RRP agent communicates all data traffic over its corresponding communication link (e.g., L1, L2, L3 or the like) to the RRP router 112 as IP-packets, regardless of the underlying wireless communication technology employed by its AP. The RRP router 112 further relays data the IP data traffic to the server device 120 via the RRP router 116 using the RRP, and vice versa.

Depending on the location and environment, multiple (e.g., two or more) different types of APs may be available to a UE to connect with to gain access to a network server (e.g., server device 120). For example, in most urban environments, both Wi-Fi and cellular connections are available in many locations, such as places of business, home environments, and other locations providing public Wi-Fi access within a cellular network coverage area. Typically, a user of a personal UE such as smartphone will choose to connect to their device to a Wi-Fi AP when available and connect to the cellular network (e.g., via the nearest base station or cell tower) when a Wi-Fi AP is unavailable. In accordance with many current wireless communication systems, a UE can only be connected to the network server via a single type of AP at time (e.g., Wi-Fi or cellular but not both). In addition, in accordance with existing GPRS tunnel/bearer-based connection-oriented architectures, each time the UE establishes a new connection with the network server via a cellular AP (e.g., APs $102_{3\text{-}5}$), the network must set up GTP tunneling before any data path communications are enabled. GTP tunneling tear down procedures are further required when the UE chooses to disconnect from their current cellular AP and connect to a new AP, such as a new cellular AP or a new Wi-Fi AP for example.

In accordance with system 100, a mobile UE can move about the network and connect to different APs $102_{1\text{-}5}$ (and additional or alternative APs) at different times, depending on location and the available APs associated with their current location (among other factors). However, unlike previous communication systems, system 100 enables the UE to be connected to two or more different types of APs at the same time. For example, as illustrated with respect to UE2, a UE could be connected to both a Wi-Fi AP (e.g., AP $102_2$) and a cellular network (e.g., AP $102_3$) at the same time. System 100 also enables the UE to be connected to two or more APs of the same type at the same time. For example, as illustrated with respect to UE3, a UE could be connected to two different cellular network APs (e.g., AP $102_3$ and AP $102_3$) at the same time. In addition, due to the usage of the RRP system and corresponding RRP, system 100 does not require GTP tunneling setup and tear down procedures each time a UE connects and disconnects from a cellular network AP (e.g., APs $102_{3\text{-}5}$).

To facilitate this end, system 100 includes a controller device 122 comprising a WAT controller component 124. In some embodiments, the controller device 122 can correspond to a RAN intelligent controller (RIC). The WAT controller component 124 can further be communicatively coupled to a network information base 126 comprising relevant information for the communication network, including information identifying the RRP agents $106_{1\text{-}3}$ of the network, the respective APs associated therewith, network policy information, RRP information, RRP routing information and the like. The RRP agents $106_{1\text{-}3}$ and the WAT controller component 124 are further communicatively coupled to one another.

The WAT controller component 124 collects (or otherwise receives) and monitors condition information for the APs included in the network (e.g., $102_{1\text{-}5}$) regarding the operating conditions associated with each of the APs. The operating conditions information can include both network and UE condition information. The network condition information can include for example, but is not limited to, information regarding current load, coverage area, link state information regarding the states of the links between the APs and their connected UEs (e.g., uplink and downlink latency, signal quality, signal strength, etc.) and associated metadata. The UE condition information can include for example, but is not limited to, information identifying respective UEs connected to each AP, information regarding UE current location and mobility state, information regarding UE type and capabilities, information regarding current UE application and service usage (e.g., what applications and services are being currently used/requested by the UE), radio frequency (RF) conditions for the service sell and neighboring cells, UE poser levels and etc. This network and UE condition information can be regularly and/or continuously received by the WAT controller component 124 in real time or substantially real time so as to reflect the current operating conditions associated with the respective APs and UEs as they change dynamically over time. In some embodiments, the operating conditions information can be collected and reported to the WAT controller component 124 via the respective RRP agents $106_{1\text{-}3}$. Additionally, or alternatively, the operating conditions information can be collected and reported to the WAT controller component 124 via the respective APs agents $102_{1\text{-}5}$, controller of the BBU pool 104, and/or the UEs.

Based on the received condition information (and in some implementations network policy information as described in greater detail infra), the WAT controller component 124 determines an assignment of the different AP $102_{1\text{-}5}$ to the UEs for usage as serving nodes for the UEs. In this regard, assignment of an AP to a UE as a serving node means the communication link (e.g., L1, L2 and L3) between that APs' RRP agent and the RRP router 112 will be used as an active serving link for the UE. Thus, the WAT controller component 124 determines, based on the current operating conditions associated with each of the APs $102_{1\text{-}5}$ and the UE conditions, which of communication links $108_{1\text{-}3}$ should be used as active serving links for the respective UEs 1-4. In this regard, as a mobile UE moves about the network, the UE can maintain active connections with two or more different APs (e.g., APs $102_{1\text{-}5}$) at any given time. The WAT controller component 124 further dynamically determines the best AP among the different AP to which the UE is connected to be the current serving node for that UE based on the respective conditions at the APs (e.g., current load), the relative position of the UE to the respective APs, quality of the respective links between the UE and the respective APs, the mobility state of the UE, network policies and other factors.

For example, with reference to UE2 which is illustrated as connected to both AP $102_1$ (W1, a Wi-Fi AP) and AP$102_3$ (R1, a cellular network AP), the WAT controller component 124 can dynamically determine and control which AP is best suited to be the current serving AP for UE2 based on the load of the respective APs, the location of the UE relative to the respective APs and their corresponding coverage areas, the mobility state of the UE (e.g., is the UE stationary or moving away from one coverage area to another) the quality of the connection between the UE and the respective APs, and other factors. Based on consideration of such condition information and a determination that W1 is the best serving AP for UE2 at the current time, the WAT controller component 124 can instruct the RRP agent $106_2$ for W1 to use L2 as the current active serving link for UE2. Alternatively, based on consideration of such condition information and a determination that R1 is the best serving AP for UE2 at the current time, the WAT controller component 124 can instruct the RRP agent $106_3$ for R1 to use L3 as the current active serving link for UE.

The WAT controller component 124 further controls setting of latency requirements of the respective communication links $108_{1-3}$ for usage by the UEs based on which AP is assigned to the respective UEs as their current serving node. In particular, the WAT controller component 124 notifies and instructs the RRP agents $106_{1-3}$ regarding how to set the uplink and downlink latency settings of their communication links $108_{1-3}$ to make them active or inactive for usage by their connected UEs based on the assignment. For example, the WAT controller component 124 can instruct the RRP agents $106_{1-3}$ to set the uplink and downlink latency values of their communication links to a useful value (e.g., 1.0 millisecond (ms) or another low latency value) to make them active for a given UE or to a non-useful value (e.g., infinity) to make them inactive for a given UE. In this regard, as mobile UEs move about the network and conditions at the APs change, the WAT controller component 124 can dynamically determine the best APs to be the serving nodes for the mobile UEs at any given point in time while allowing them to maintain active connections with multiple (e.g., two or more) APs at the same time. In addition, the UEs can be actively connected to APs of different types (e.g., Wi-Fi and cellular for instance and other different combinations of wireless communication technologies).

Furthermore, in the case of cellular AP connections, once a UE has established a connection to a cellular AP (e.g., APs $102_{3-5}$) and the WAT controller component 124 determines that a different AP is better suited for the UE to be the UE's serving node, rather than tearing down that connection, the WAT controller component 124 can simply instruct that cellular AP's RRP agent (e.g., RRP agent $106_3$) to set the latency of its communication link to the RRP router 112 (e.g., L3) to an inactive value for that UE (e.g., infinity or another high value that renders the link void), thereby avoiding GTP tunneling tear-down procedures. Likewise, if conditions change and the WAT controller component 124 determines that the cellular AP connection is now the better connection for that UE, the WAT controller component 124 can instruct that cellular AP's RRP agent to change the latency of its communication link to the RRP router to an active value (e.g., 1.0 ms or another low-latency value), thereby avoiding performance of a new GTP setup procedure.

The respective RRP agents $106_{1-3}$ further maintain and update routing tables with information regarding the states of the UEs connected to their corresponding APs $102_{2-5}$, including information regarding the current uplink (and optionally downlink) latency settings for usage (or non-usage) of their corresponding communication links $108_{1-3}$ by their connected UEs. In some embodiments, the RRP agents $106_{1-3}$ can further determine and set the latency values for the respective UEs based on the instructions received from the WAT controller component 124 (regarding whether the link should be an active serving link or not, as well as handover routing instructions) and current load conditions of their APs $102_{1-5}$.

The RRP agents $106_{1-3}$ communicate the uplink data packets to the RRP router 112 according to the uplink latency settings per UE, and RRP router 112 communicate the downlink data packets to the RRP agents $106_{1-3}$ according to the downlink settings per UE. In one or more embodiments, once determined based on the instructions provided by the WAT controller component 124, the RRP agents $106_{1-3}$ can notify and instruct the RRP router 112 regarding the respective serving links and associated downlink settings to be used by RRP router 112 for the respective UEs. The RRP router 112 can further maintain and update routing tables with information regarding the serving links for the respective UEs and the downlink latencies to be applied. The RRP router 112 can further manage and control downlink packet forwarding from a previous serving AP to a new serving AP for a UE during handover procedures in accordance with the RRP to ensure zero packet loss during handovers.

Figure 2:
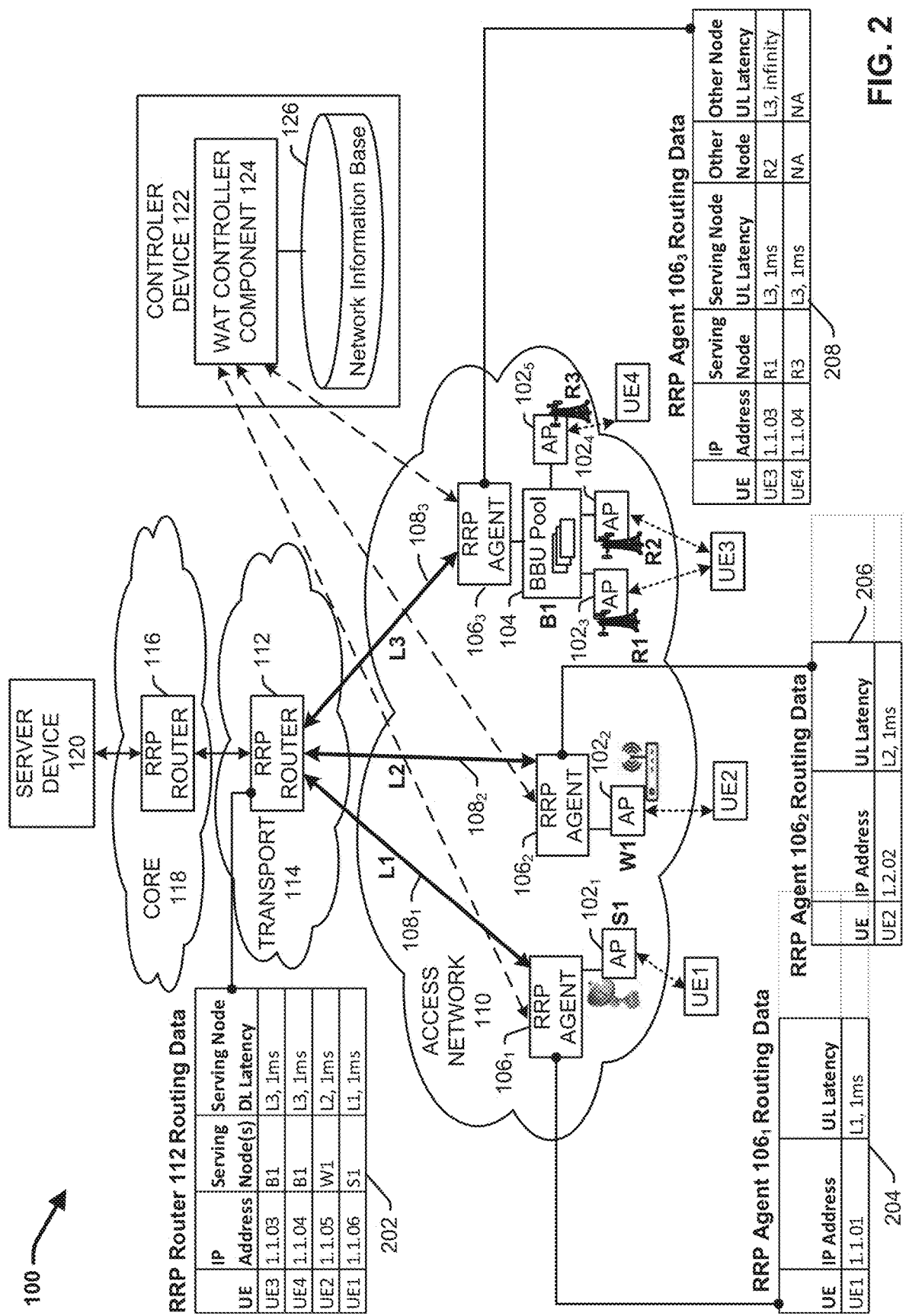
FIGS. 2-4 present example routing table information associated with respective RRP devices of a communication system that facilitates connectionless mobility management for hybrid networks using RRP in association with an example usage scenario, in accordance with various aspects and embodiments of the disclosed subject matter.
Figure 3:
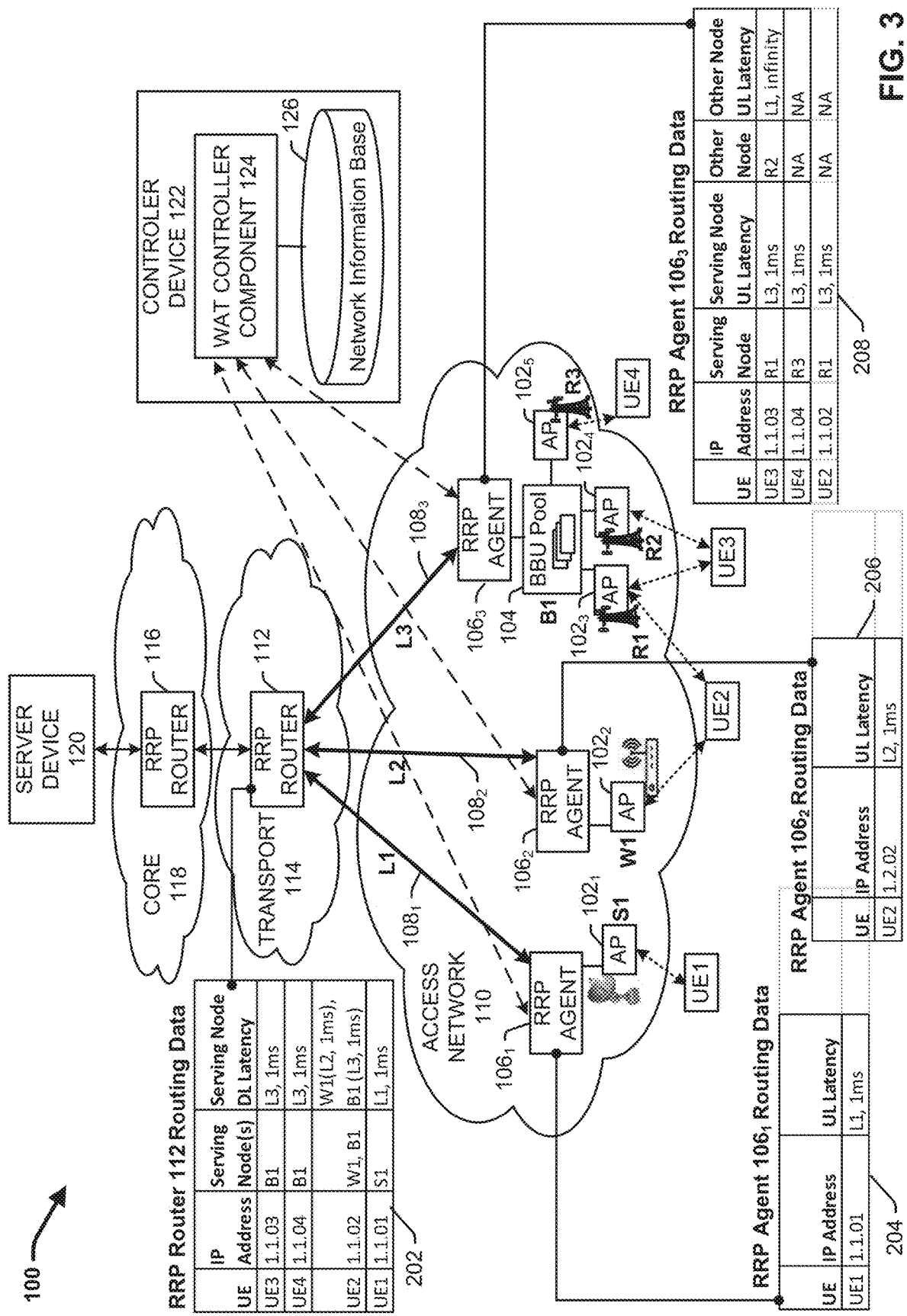
Figure 4:
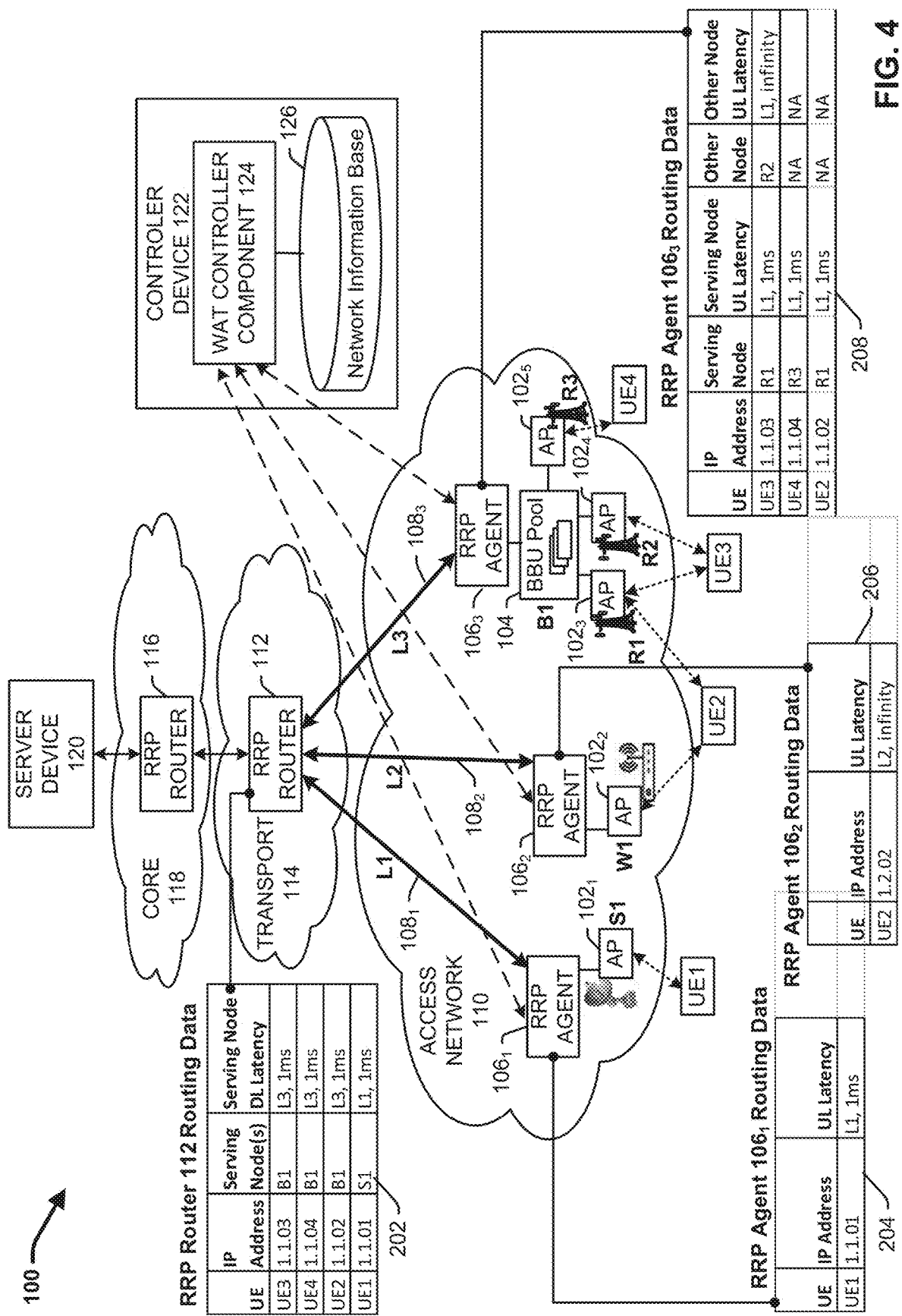

FIGS. 2-4 present example routing table information associated with respective RRP devices of a wireless communication system that facilitates connectionless mobility management for hybrid networks using RRP in association with an example usage scenario, in accordance with various aspects and embodiments of the disclosed subject matter. As illustrated in FIGS. 2-4, the RRP router 112 and the respective RRP agents $106_{1-3}$ can maintain and update routing tables (routing tables 202-208 respectively) with routing information for the UEs of the communication network 100. In accordance with the usage scenario illustrated, the routing tables reflect the connections and routing information for UEs 1-4 based on their established connections to the corresponding APs. In this context, reference to an "established" connection between a UE and an AP refers to the fact that the connection between the UE and the AP has been previously set up and established between the UE and the AP using the corresponding wireless communication access technology of that AP. The routing tables for each of the RRP agents respectively comprise information identifying the UEs connected to the corresponding APs, their IP addresses, and the uplink latency (UL) value settings to be applied by the respective RRP agents for the corresponding UEs. In the case of a cellular access network comprising a plurality of base stations managed by a single RRP agent, as illustrated with respect to RRP agent $106_3$, the routing table 208 for this RRP agent $106_3$ can also specify the specific base station among the group of base stations to which each UE is connected and the corresponding UL latency value settings to be applied. The routing table 202 associated with the RRP router 112 can comprise information identifying the respective UEs and their IP addresses, their serving nodes and the serving node downlink latency to be applied over the corresponding links L1-L3. From the perspective of RRP router 112 and the cellular access network, the serving node of relance to the RRP router 112 only concerns the particular RRP router agent 106₃ to send the downlink data packets for any UE connected to the cellular network, regardless of the specific base station to which they are connected, as these routing details are managed by the BBU pool controller. In this sense, the serving node associated with the router agent 106₃ is collectively referred to as B1.

In accordance with the usage scenario illustrated in FIG. 2, UE1 is connected to S1 (AP 102₁), UE2 is connected to W1 (AP 102₂), UE3 is connected both R1(AP 102₃) and R2 (AP 102₄) and UE4 is connected to R3 (AP 102₅). As indicated in routing table 204 for RRP agent 106₁, the UL latency for L1 is set to 1 ms for UE1, indicating that S1 is the current serving node for UE1. This is also reflected in routing table 202 for the RRP router 112 with respect to the DL latency to be applied over L1 for UE1 being set to 1 ms. Similarly, as indicated in routing table 206 for RRP agent 106₂, the UL latency for L2 is set to 1 ms for UE2, indicating that W1 is the current serving node for UE2. This is also reflected in routing table 202 for the RRP router 112 with respect to the DL latency to be applied over L2 for UE2 being set to 1 ms. With reference to FIG. 2 and routing table 208, the routing information identifies each of the UEs connected to the cellular network, the specific base station or stations to which they are connected, and the UL latency to be applied over the corresponding links. In this regard, with respect to UE3 which is connected to both R1 and R2, the UL latency for L3 is set to 1 ms for R1 and infinity for R2, indicating that R1 is the current serving node for UE3, despite UE3 maintaining established connections with both R1 and R2. This is also reflected in routing table 202 for the RRP router 112 with respect to the DL latency to be applied over L3 for UE3 being set to 1 ms and the serving node being set to B1. For UE4 which is connected to R3, the UL latency for L3 is set to 1 ms for R3, indicating that R3 is the current serving node for UE4. Because UE4 is not connected to another base station in the cellular network, the latency settings for these additional nodes are not applicable (NA). This is also reflected in routing table 202 for the RRP router 112 with respect to the DL latency to be applied over L3 for UE4 being set to 1 ms and the serving node being set to B1.

Referring now to FIGS. 2 and 3 and UE2 in particular, let's assume that UE2 has begun moving away from W1 and established a connection with R1. In this example, UE2 has connections with both W1 and R1. During this transition, the WAT controller component 124 receives relevant information for UE2 that can be used to determine the best serving AP or APs for UE2, such as but not limited to, information indicating that UE2 is moving away from W1 and into the coverage area of R1, information regarding the current loads of W1 and R1, information regarding the speed of movement of UE2, information regarding the quality of the links between UE2 and W1 and R1 respectively, and so on. Based on this information, the WAT controller component 124 has decided that both W1 and R2 should be used as active serving nodes for UE2, meaning that data packets communicated to and from UE2 and the server device 120 should be routed over both L2 and L3. As a result, the WAT controller component 124 has instructed the RRP agent 106₃ for R1 to set the UL latency for UE2, R1 and L3 to 1 ms. This is also reflected in the corresponding routing tables. For example, routing table 206 still indicates the UL latency for UE2 over L2 is set to 1 ms. In addition, the routing table 208 for RRP agent 106₃ now indicates that UE2 is connected to R1 and that L3 should be used as an active serving link for UE2, with a useful UL latency value of 1 ms. In addition, the routing table 202 for the RRP router indicates that UE2 has two serving nodes for the downlink data traffic to be forwarded for UE2, both W1 and B1. The serving node DL latency for both of these serving nodes and corresponding communication links L2 and L3 is further set to 1 ms, a meaningful active value.

Referring now to FIG. 4, in this example, UE2 is still connected to both W1 and R2. However, some conditions have changed that have made the WAT controller component 124 decide that R1 is the better serving node for UE2 over W1. For example, the load at R1 may have decrease while the load at W1 may have increased. Another factor that could reflect this decision may be based on UE2 being now located closer to R1 and thus having a stronger connection to R1 over W1. Another factor that could reflect this decision may be based on UE2 using a different application or service provided by server device 120 that is better facilitated by R1 as opposed to W1. Various other conditional factors and basis for this decision are envisioned. In this case, because the WAT controller has decided that R1 should be the only current serving node for UE2 even though UE2 remains connected to W1, the WAT controller has instructed the RRP agent 106₂ for W1 to set the UL latency value for UE2 and L2 to infinity, a non-useful or void value, making L2 essentially inactive for UE2. The RRP agent 106₂ for W1 in turn notifies the RRP router 112 regarding the downlink latency that should be applied for L2 and UE2 should also be set to a void or inactive value. As a result, the RRP router 112 updates the routing table 202 for UE2 to indicate that the only current serving node for UE2 downlink data packets is B1 and L3, with an active latency value therefore of 1 ms.

In some embodiments, the WAT controller component 124 can assign different APs and/or associated links L1-L3 to a same UE for uplink communications and downlink communications. For example, a UE can be connected to a first AP and a second AP n the access network layer simultaneously, such as UE2 and UE3 as illustrated in FIG. 4. With these embodiments, depending on the UE and network conditions associated with the respective APs to which they are connected, the WAT controller component 124 can assign the first AP and associated first communication link between that APs RRP agent the RRP router 112 to be used for UL data traffic for that UE, and assign the second AP and associated second communication link between that APs RRP agent and the RRP router 112 to be used for DL traffic for that UE.

Figure 5:
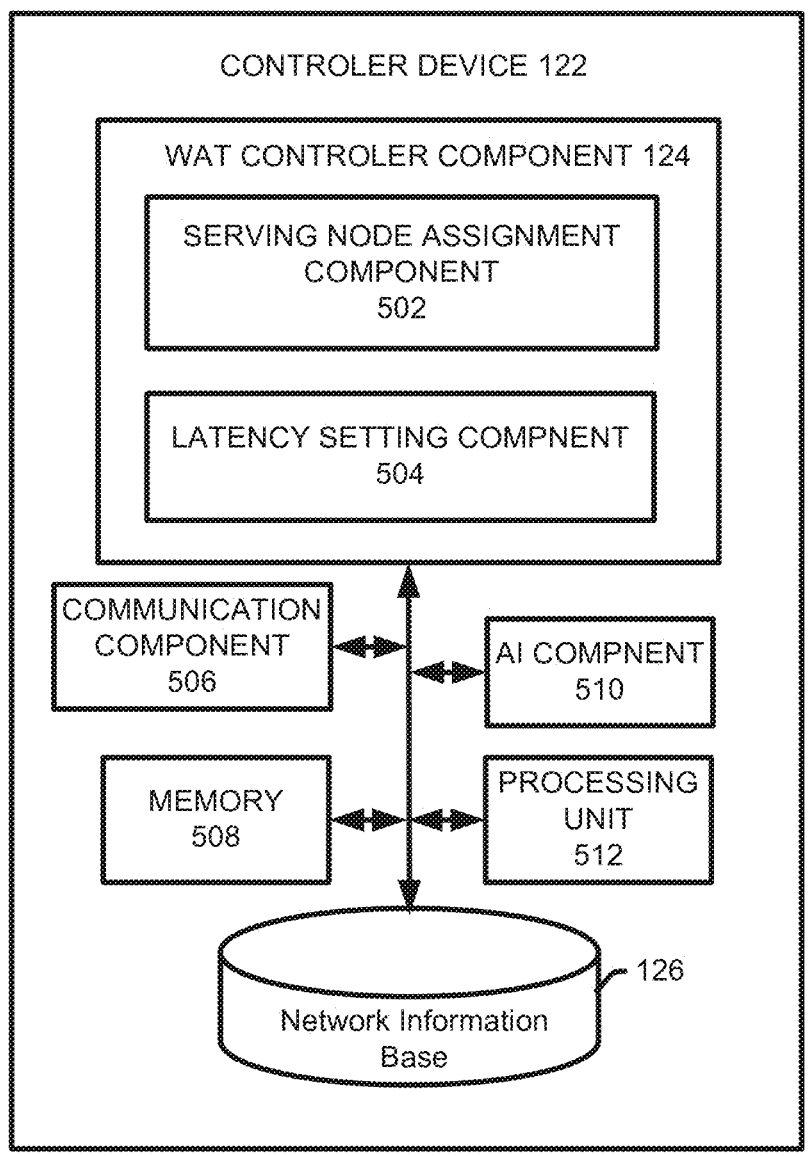
FIG. 5 illustrates a block diagram of an example controller device that facilitates connectionless mobility management for hybrid networks using RRP, in accordance with various aspects and embodiments of the disclosed subject matter.

FIG. 5 illustrates a block diagram of an example controller device 122 that facilitates connectionless mobility management for hybrid networks using RRP, in accordance with various aspects and embodiments of the disclosed subject matter. Repetitive description of like elements employed in respective embodiments is omitted for sake of brevity.

Embodiments of systems and devices described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, the controller device 122 can include various computer executable components, including WAT controller component 124, serving node assignment component 502, latency setting component 503, communication component 506 and AI component 510. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 508 of the controller device 122 which can be coupled to processing unit 512 for execution thereof. Examples of said and memory and processor as well as other suitable computer or computing-based elements, can be found with reference to FIG. 11, and can be used in connection with implementing one or more of the systems or components shown and described in connection with FIG. 1, FIG. 5, or other figures disclosed herein.

With reference to FIGS. 1 and 5, the communication component 506 can include or correspond to hardware and/or software that facilitates communication between the controller device 122 and other devices of the communication system 100. For example, the communication component 506 can include suitable hardware and/or software that facilitates wired and/or wireless communication between the controller device 122 and the RRP agents $106_{1-3}$, the RRP router 112, the RRP router 116, the APs$_{1-5}$, the UEs 1-4, the BBU pool 104, the server device 120 and other devices. To this end, the communication component 506 can receive the condition information from these network nodes and/or the UEs reporting on their current operating conditions. As noted above, this condition information can include a variety of relevant information that may be used by the WAT controller component 124 to dynamically determine the best serving APs for the respective UEs at any given time. For example, the condition information can include load information reported by the respective APs and/or their RRP agents indicating their current load. For example, the condition information can also identify the respective UEs connected to the respective APs, information regarding link quality between the UEs and their APs (e.g., throughput, signal to noise interference ratio (SINR), and additional network condition information discussed above. The condition information can also include UE specific condition information including information regarding UE location, mobility state, application usage and associated latency requirements, and so on, as discussed above. In some embodiments, the communication component 506 can also receive and/or otherwise access the current routing information for each of the UEs. The current routing information for each of the UEs can include the information maintained in the routing tables associated with the RRP router agents $106_{1-3}$, and the RRP router 112 as exemplified in FIGS. 2-4.

The serving node assignment component 502 can further monitor and evaluate the received condition information in real time or substantially real time to dynamically determine the best serving AP or APs for any given UE based on the current conditions associated with each UE and AP and the current routing information for each of the UEs. In this regard, the serving node assignment component 502 can determine, based on the condition information (and optionally the current routing information for the respective UEs, including information indicating or identifying the current serving APs for the respective UEs), an assignment or re-assignment of the different APs to the UEs to be used as the current serving APs for the respective UEs. In this manner, with respect to re-assignment determinations, the serving node assignment component 502 can determine and control handover decisions.

In some embodiments, the serving node assignment component 502 can employ a rule-based serving node assignment scheme defined in the network information base 126 that controls how to select the optimal serving node for a given UE from amongst two or more available APs with which the UE has previously established connections thereto based on the current operating conditions. For example, the rule-based serving node assignment scheme can define preferences and hierarchies for assigning available APs to UEs based on current loads of the respective APs that facilitates balancing the loads of the respective APs to achieve optimal communication of data traffic amongst the respective APs. In another example, the rule-based serving node assignment scheme can define preferences and hierarchies for assigning available APs as serving nodes to the respective UEs based on relative location of the UEs to the respective APs, signal strength, service level needs and requirements, and so on that facilitates optimizing delivery of data traffic to the respective UEs while balancing AP loads. Such a rule-based serving node assignment scheme can optionally reflect network policy information for the respective APs and UEs, including policies regarding authorized APs the respective UEs are allowed to employ under different operation contexts and conditions, AP load restrictions, optimal types of APs for different types of services and application usages and service level requirements for different UE types and/or user accounts.

The latency setting component 504 can further instruct the respective RRP agents $106_{1-3}$ regarding how to set the uplink and downlink latency values of their respective communication links $108_{1-3}$ for usage by the respective UEs based on the serving node assignment determinations made by the serving node assignment component 502. In some embodiments, the latency setting component 504 can instruct the respective RRP agents $106_{1-3}$ regarding determinations of serving node assignments and re-assignments for the UEs once determined. For example, in response to a determination that a new AP should be used as a serving node for a UE, the latency setting component can send (e.g., via communication component 506) the corresponding RRP agent for the new AP a serving node an assignment message with information informing the RRP agent that the AP managed by that RRP agent has been assigned to be the UE's current serving node. The RRP agent can further adjust the latency setting of its communication link with the RRP router 112 for sending UL data traffic via the communication link for the UE accordingly. For example, based on the reception of the serving node assignment message, the RRP agent can be configured to set the UL latency setting for the UE data traffic over its communication link (e.g., of communication links $108_{1-3}$) to a default meaningful value (e.g., 1 ms) for the UE that makes the communication link active for the UE uplink data traffic. In another implementation, based on the reception of the serving node assignment message, the RRP agent can be configured to set the UL latency setting for the UE data traffic over its communication link to a value that is less than a threshold latency value that makes the communication link active for the UE uplink data traffic. With these implementations, the RRP agent can discretionally determine and apply the appropriate UL latency setting for the UE within the threshold based on the relevant network conditions associated with the AP (e.g., load) and/or conditions associated with the UE (e.g., UE type, UE, location, UE mobility state, UE current service usage latency needs, etc.).

In some embodiments, the RRP agent can further be configured to notify the RRP router 112 regarding the appropriate DL settings to be applied by the RRP router 112 for the UE in association with sending DL data traffic for the UE over the communication link as well. For example, based on the serving node assignment message, the RRP agent can inform the RRP router 112 to make the link active for DL traffic for the UE, to set the DL settings to a default active value (e.g., 1 ms), or to set the DL latency setting to a value that is less than a threshold latency setting, or another meaningful DL latency setting determined by the RRP router 112 based on the relevant network and UE conditions. In this regard, in some embodiments, the UL and DL latency settings for an active communication link can be the same or different.

Similarly, in response to a determination that a new AP should be used as a serving node for a UE, the latency setting component 504 can send (e.g., via communication component 506) the corresponding RRP agent for the current AP being used as the UE's serving node, a serving node re-assignment message with information informing the RRP agent that the AP managed by that RRP agent should stop actively serving the UE. Based on reception of the serving node re-assignment message, the RRP agent can further adjust the latency setting of its communication link with the RRP router 112 for the UE accordingly to make its communication link inactive for the UE. For example, the RRP agent can be configured to set the UL latency setting for the UE data traffic over its communication link (e.g., of communication links $108_{1-3}$) to a default non-meaningful/non-useful value (e.g., infinity, 100,000 ms, etc.) for the UE, or another non-meaningful value that exceeds a threshold meaningful latency value, that makes the communication link inactive for the UE uplink data traffic. In some embodiments, the RRP agent can further be configured to notify the RRP router 112 regarding the appropriate DL settings to be applied by the RRP router 112 for the UE to make the communication link inactive for sending DL data traffic for the UE by the RRP router. For example, the RRP agent can inform the RRP router 112 to make the link inactive for DL traffic for the UE, to set the DL settings to a default inactive/non-useful value (e.g., infinity, 100,000 ms, etc.) or the like.

Additionally, or alternatively, the latency setting component 504 can determine the appropriate UL and/or DL latency settings to be applied by the RRP agents and the RRP router 112 respectively based on determinations of serving node assignments and re-assignments for the UEs by the serving node assignment component 502. With these embodiments, alternative to sending an RRP router a serving node assignment or re-assignment message with information merely indicating whether make its communication link an active or inactive serving link for a UE (and leaving the actual determination of how to adjust the latency settings accordingly up to the RRP router agent), the latency setting component 504 can determine the specific latency settings to be applied, and send (e.g., via communication component 506) the RRP router with a latency setting message that includes information identifying the specific UL and/or DL latency settings to be applied. For example, based on a determination that an AP controlled by an RRP router should be used as an active serving node for a UE, the latency assignment component 504 can determine the appropriate UL and/or DL latency settings to be applied to the RRP agent's communication link with the RRP router 112 for the UE. For instance, the latency setting component 504 can discretionally determine the appropriate UL and/or DL latency settings for the UE that are within a defined active threshold range based on the relevant network conditions associated with the AP (e.g., load) and/or conditions associated with the UE (e.g., UE type, UE, location, UE mobility state, UE current service usage latency needs, etc.). Alternatively, the latency setting component 504 can be configured to instruct the RRP agent to set the latency settings to a default active value (e.g., 1 ms). Similarly, based on a determination that an AP controlled by an RRP router should no longer be used as an active serving node for a UE, the latency assignment component 504 can instruct the RRP agent of the UE's current active serving node to set the UL and/or DL latency setting of its communication link to the default inactive value.

In some embodiments, controller device 122 can comprise or be associated with an artificial intelligence (AI) component (e.g., AI component 510) to facilitate determining the serving node assignments and re-assignments and/or determining the corresponding appropriate latency settings to be applied to the communication links $108_{1-3}$ based on the serving node assignments/re-reassignments. In accordance with these embodiments, the AI component 510 can perform an AI and/or machine learning (ML) analysis on the received network and UE condition information to determine or infer the appropriate serving APs for the UEs and/or the appropriate UL/DL latency settings based on the multitude of dynamic conditions as they change over time. With these embodiments, the AI component 510 can analyze data comprising or relating to users associated with the UEs (e.g., user preferences of users associated with communication devices or communication networks), data traffic associated with data sessions involving UEs, communication conditions associated with communication links $108_{1-3}$, communication conditions associated with links between the UEs and their connected APs, network components, or communication devices (which also can include various communication network conditions (e.g., network congestion, network resource availability, or other communication network conditions associated with the communication system 100), applications, services, UE location data, metadata, historical information relating thereto, network policy information, or other desired types of information.

In some embodiments, in connection with or as part of such an AI or ML analysis, the AI component 510 can employ, build (e.g., construct or create), and/or import, AI and/or ML techniques and algorithms, AI and/or ML models, neural networks (e.g., neural networks trained using the AI component 510), and/or graph mining to render and/or generate predictions, inferences, calculations, prognostications, estimates, derivations, forecasts, detections, and/or computations that can facilitate determining whether data traffic associated with a data session between UEs and their current serving APs is to be re-routed to a new serving AP; a data traffic type of data traffic associated with a data session associated with a the UEs; a service or application type of a service or application being utilized during the data session; a characteristic value associated with a characteristic (e.g., communication rate, QoS level, data throughput level, priority, importance, or criticality level, or other type of characteristic value associated with a characteristic associated with the data session); a type of problem associated with a communication channel; a location (e.g., location within or associated with a communication network) of the problem with the communication channel; a source (e.g., node(s), device, or other source) of the problem associated with the communication channel; whether to adapt (e.g., modify, adjust, or change) a condition of the policy relating conditions under which data traffic can be re-rerouted; a defined threshold characteristic value associated with a characteristic (e.g., defined threshold communication rate, defined threshold QoS level, defined threshold data throughput level, defined threshold priority, importance, or criticality level, or other defined threshold characteristic value) to utilize to facilitate determining whether to re-route the data traffic associated with the data session; whether to adapt a defined threshold characteristic value to a different threshold characteristic value (e.g., with regard to a user (e.g., on a per user basis), or a subscription or an account associated with a user or UE); and/or facilitate making other desired determinations, such as the determinations described herein; and/or facilitating automating one or more functions or features of the disclosed subject matter (e.g., automating one or more functions or features of or associated with the server node assignment component 502 and the latency setting component 504).

The AI component 510 can employ various AI-based or ML-based schemes for carrying out various embodiments/examples disclosed herein. In order to provide for or aid in the numerous determinations (e.g., determine, ascertain, infer, calculate, predict, prognose, estimate, derive, forecast, detect, compute) described herein with regard to the disclosed subject matter, the AI component 510 can examine the entirety or a subset of the data (e.g., the network and UE conditions data, data associated with data sessions, UEs, network policy information, and other data) to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z1, z2, z3, z4, \ldots, zn)$, to a confidence that the input belongs to a class, as by $f(z)=$confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 6:
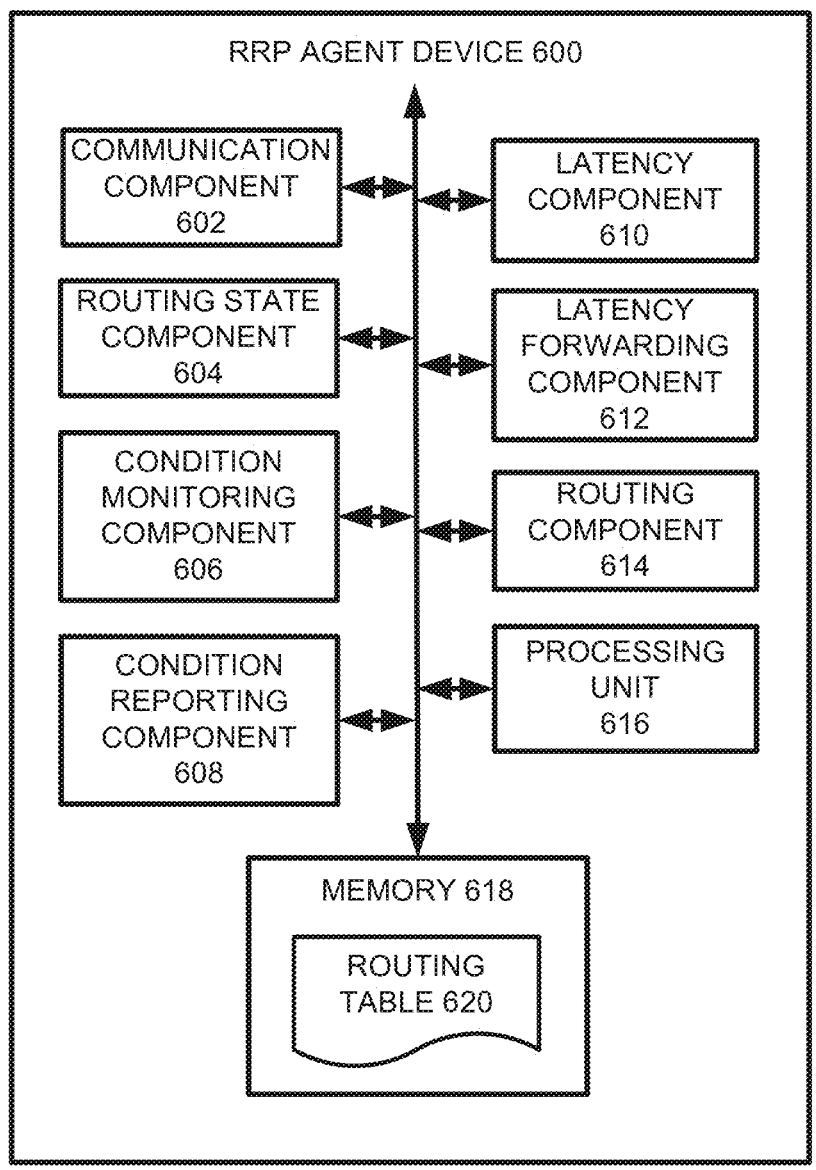
FIG. 6 illustrates a block diagram of an example RRP agent device that facilitates connectionless mobility management for hybrid networks using RRP, in accordance with various aspects and embodiments of the disclosed subject matter.

FIG. 6 illustrates a block diagram of an example RRP agent device 600 that facilitates connectionless mobility management for hybrid networks using RRP, in accordance with various aspects and embodiments of the disclosed subject matter. With reference to FIGS. 1 and 6, the RRP agent device 600 can include or correspond to any of the RRP agents $106_{1-3}$ of system 100. Repetitive description of like elements employed in respective embodiments is omitted for sake of brevity.

The RRP agent device 600 can be or include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, the RRP agent device 600 can include various computer executable components, including communication component 602, routing state component 604, condition monitoring component 606, condition reporting component 608, latency component 610, latency forwarding component 612, and routing component 616. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 618 of the RRP agent device 600 which can be coupled to processing unit 616 for execution thereof. Examples of said and memory and processor as well as other suitable computer or computing-based elements, can be found with reference to FIG. 11, and can be used in connection with implementing one or more of the devices, systems or components shown and described in connection with FIG. 1, FIG. 6, or other figures disclosed herein.

With reference to FIGS. 1 and 6, the communication component 602 can include or correspond to hardware and/or software that facilitates communication between the RRP agent device 600 and other devices of the communication system 100. For example, the communication component 602 can include suitable hardware and/or software that facilitates wired and/or wireless communication between the RRP agent device 600 and the controller device 122, the RRP router 112, the one or more APs (e.g., of $APs_{1-5}$) to which the RRP router agent device 600 is connected to, the BBU pool 104 controller (in some cellular network environments), the UEs, other devices.

The routing state component 604, can maintain and update the current routing information for the RRP agent device 600 in a routing table 620 stored in memory 618 (or another suitable data structure) associated with the RRP agent device 600. The current routing information can correspond to the routing table data included in the routing tables 204-208 described with reference to FIGS. 2-4. In this regard, the routing state component 604 can determine and maintain routing information (e.g., in the routing table 620) for the RRP agent device 600 that identifies all UEs (e.g., via their IP addresses or another device identifier) connected to the AP or respective APs that the RRP agent device manages.

In implementations in which the RRP agent device 600 is connected to and controls routing for a single AP (e.g., RRP agents 106$_{1-2}$), the routing state component 604 can further determine and maintain information regarding whether the AP is currently being used as a serving node (or not) for the connected UEs and/or the UL latency setting values to be applied by the RRP agent device for the respective UEs in association with sending uplink data packets to the RRP router 112 over its communication link therewith (e.g., of communication links 108$_{1-3}$). In implementations in which the RRP agent device 600 is connected to and controls routing for a group of APs (e.g., RRP agents 106$_3$), the routing state component 604 can further determine and maintain the same type of information for each AP included in the group (e.g., as exemplified with respect to routing table 208).

In some embodiments, the condition monitoring component 606 can collect and monitor changes in the relevant UE and network node condition information associated with the AP or APs with which the RRP agent device 600 is connected to and configured to manage. For example, the condition monitoring component 606 can collect condition information regarding current load of the AP or respective APs, information regarding link quality between the UEs and the APs, information regarding UE location and mobility state, and the various other types of condition information described above. The condition reporting component 608 can further report (e.g., via the communication component 602) the collected condition information to the controller device 122. In some embodiments, the condition reporting component 608 can be configured to report condition information to the controller device 122 in response to changes in the condition information (e.g., only report the condition information when changes are reflected, such as changes in load state, changes in UE connections, etc.). Additionally, or alternatively, the condition reporting component 608 can be configured to report the condition information according to a defined schedule (e.g., every minute, every 5 minutes, etc.), or continuously.

The latency component 610 can control the latency settings applied by the RRP agent device 600 for communication of data traffic over its communication link (e.g., of communication links 108$_{1-3}$) with the RRP router 112 for the respective UEs connected to the one or more APs to which the RRP agent device 600 is coupled based on instructions received from the controller device 122 (e.g., via the communication component 602). In this regard, in some embodiments, the latency component 610 can receive the serving node assignment and re-assignment messages from controller device 122 and adjust the latency settings for the identified UEs accordingly, as described above. For example, the latency component 610 can receive a serving node assignment message from the controller device 122 with information informing the RRP agent device 600 that the AP managed by the RRP agent device has been assigned to be the UE's current serving node. The latency component 610 can further adjust the latency setting (e.g., in the routing table 620) of its communication link with the RRP router 112 for sending UL data traffic via the communication link for the UE accordingly. For example, based on the reception of the serving node assignment message, the latency component 610 can be configured to set the UL latency setting for the UE data traffic over its communication link (e.g., of communication links 108$_{1-3}$) to a default meaningful value (e.g., 1 ms) for the UE that makes the communication link active for the UE uplink data traffic. In another implementation, based on the reception of the serving node assignment message, the latency component 610 be configured to set the UL latency setting for the UE data traffic over its communication link to a value that is less than a threshold latency value that makes the communication link active for the UE uplink data traffic. With these implementations, the latency component 610 can discretionally determine and set (e.g., in the routing table 620) the appropriate UL latency setting for the UE within the threshold based on the relevant network conditions associated with the AP (e.g., load) and/or conditions associated with the UE (e.g., UE type, UE, location, UE mobility state, UE current service usage latency needs, etc.).

In some embodiments, the latency forwarding component 612 can further be configured to notify (e.g., via communication component 602) the RRP router 112 regarding the appropriate DL settings to be applied by the RRP router 112 for the UE in association with sending DL data traffic for the UE over the communication link as well. For example, based on the serving node assignment message, the latency forwarding component 612 can inform the RRP router 112 to make the link active for DL traffic for the UE, to set the DL settings to a default active value (e.g., 1 ms), or to set the DL latency setting to a value that is less than a threshold latency setting, or another meaningful DL latency setting determined by the RRP router 112 based on the relevant network and UE conditions. In this regard, in some embodiments, the UL and DL latency settings for an active communication link can be the same or different.

Similarly, the latency component 610 can receive (e.g., via communication component 602) a serving node re-assignment message from the controller device 122 with information informing the RRP agent device 600 that the AP managed by that RRP agent should stop being used to actively serve a connected UE. Based on reception of such a serving node re-assignment message, the latency component 610 can further adjust (e.g., in the routing table 620) the latency setting of its communication link with the RRP router 112 for the UE accordingly to make its communication link inactive for the UE. For example, the latency component 610 can be configured to set the UL latency setting for the UE data traffic over its communication link (e.g., of communication links 108$_{1-3}$) to a default non-meaningful/non-useful value (e.g., infinity, 100,000 ms, etc.) for the UE, or another non-meaningful value that exceeds a threshold meaningful latency value, that makes the communication link inactive for the UE uplink data traffic. The latency forwarding component 612 can also be configured to notify (e.g., via communication component 602) the RRP router 112 regarding the appropriate DL settings to be applied by the RRP router 112 for the UE to make the communication link inactive for sending DL data traffic for the UE by the RRP router 112. For example, the latency forwarding component 612 can inform or instruct the RRP router 112 to make the DL latency setting of the link inactive for DL traffic for the UE, to set the DL settings to a default inactive/non-useful value (e.g., infinity, 100,000 ms, etc.) or the like.

Additionally, or alternatively, the latency component 610 can receive latency setting messages from the controller device 122 that include information identifying the specific UL and/or DL latency settings to be applied for respective UEs connected to the AP or APs controlled by the RRP agent device 600 and the latency component 610 can update the latency settings in the routing table 620 accordingly. The latency forwarding component 612 can similarly forward DL latency settings to be applied by the respective UEs to the RRP router device for application thereof.

The routing component 614 can perform the routing of the data traffic for the respective UEs managed/controlled by the RRP agent device 600 according to the latency settings defined in the routing table 620. In this regard, the routing component 614 can forward UL data packets for the respective UEs received at the AP or APs to which the RRP agent device 600 is coupled to the router device 112 over its communication link (e.g., of communication links $108_{1-3}$) according to the UL latency settings defined in the routing table 620 for the respective UEs. The routing component 614 can similarly receive DL data packets routed to the respective UEs from the RRP router device 112 and forward these DL data packets back to the UEs via their connected AP.

Figure 7:
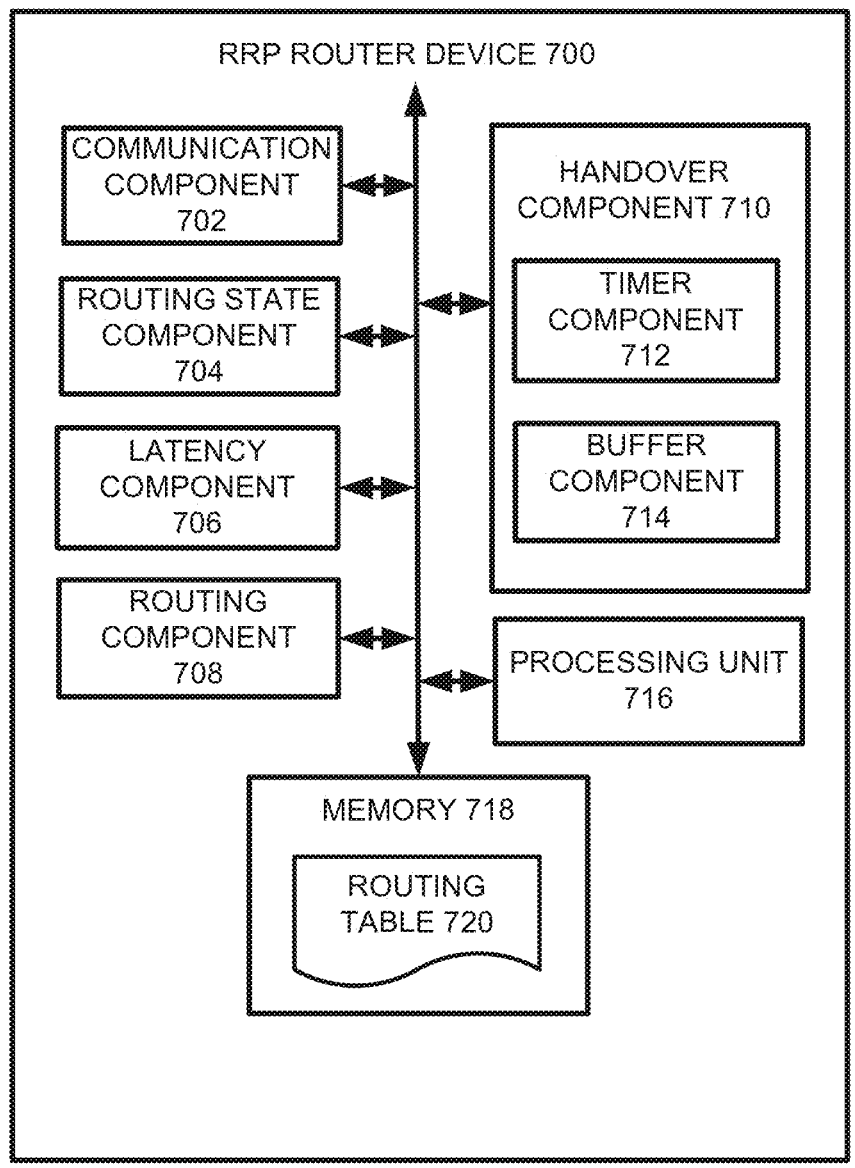
FIG. 7 illustrates a block diagram of an example RRP router device that facilitates connectionless mobility management for hybrid networks using RRP, in accordance with various aspects and embodiments of the disclosed subject matter.

FIG. 7 illustrates a block diagram of an example RRP router device 700 that facilitates connectionless mobility management for hybrid networks using RRP, in accordance with various aspects and embodiments of the disclosed subject matter. With reference to FIGS. 1 and 7, the RRP router device 700 can include or correspond to the RRP router 112 of system 100. Repetitive description of like elements employed in respective embodiments is omitted for sake of brevity.

The RRP agent device 700 can be or include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. For example, the RRP router device 700 can include various computer executable components, including communication component 702, routing state component 704, latency component 706, routing component 708, handover component 710, timer component 712, and buffer component 714. These computer/machine executable components (and other described herein) can be stored in memory associated with the one or more machines. The memory can further be operatively coupled to at least one processor, such that the components can be executed by the at least one processor to perform the operations described. For example, in some embodiments, these computer/machine executable components can be stored in memory 718 of the RRP router device 700 which can be coupled to processing unit 716 for execution thereof. Examples of said and memory and processor as well as other suitable computer or computing-based elements, can be found with reference to FIG. 11, and can be used in connection with implementing one or more of the devices, systems or components shown and described in connection with FIG. 1, FIG. 7, or other figures disclosed herein.

With reference to FIGS. 1 and 7, the communication component 702 can include or correspond to hardware and/or software that facilitates communication between the RRP router device 700 and other devices of system 100. For example, the communication component 702 can include suitable hardware and/or software that facilitates wired and/or wireless communication between the RRP router device 700 and the RRP agents $106_{1-3}$ and the RRP router 116

The routing state component 704, can maintain and update the current routing information for the RRP router device 700 in a routing table 720 stored in memory 718 (or another suitable data structure) associated with the RRP router device 700. The current routing information can correspond to the routing table data included in routing table described with reference to FIGS. 2-4. In this regard, the routing state component 704 can determine and maintain routing information (e.g., in the routing table 720) for the RRP router device that identifies all UEs (e.g., via their IP addresses or another device identifier) connected to respective APs of the system 100 (e.g., $102_{1-5}$ and the like) via corresponding router agents $106_{1-3}$, the respective serving links of communication links $108_{1-3}$ (and the like) to be used for DL data traffic for the respective UEs, and the applicable DL latency values to be applied for the respective UEs over the respective communication links.

The latency component 706 can control the DL latency settings to be applied by the RRP router device 700 and set for the respective UEs in the routing table. For example, the latency component 706 can receive (e.g., via communication component 702) the forwarded DL latency setting information provided by the respective RRP agents $108_{1-3}$) and update the routing table 720 accordingly. The routing component 708 can further perform the routing of the DL data traffic for the respective according to the routing information and latency settings defined in the routing table 720. In this regard, the routing component 708 can forward DL data packets for the respective UEs received at the RRP router device 700 from the server (e.g., via the RRP router 718) to the respective RRP agents $106_{1-3}$ over their corresponding communication links $108_{1-3}$ according to the DL latency settings and serving node assignments.

The handover component 710 can further manage and control downlink packet forwarding during handovers procedures in accordance with the RRP to ensure zero packet loss during handovers. In this regard, a handover corresponds of a re-assignment of a UE to a new serving AP that is managed/controlled via a different RRP agent relative to a previous RRP agent. In various embodiments, the handover component 710 can monitor and detect the occurrence of a handover for a UE in response to reception of new DL latency setting information for a UE (e.g., from a corresponding of RRP agents $106_{1-3}$) that indicates a new communication link of communication links $108_{1-3}$ is to used as the active serving link for the UE, and/or in response to reception of new DL latency setting information for the UE that a current serving link should be set to an inactive latency setting for the UE. When this occurs, the timer component 710 can initiate a handover timer that is set to a defined duration over which any data packets received at the RRP router device 700 for sending to the UE over the old/previous link are stored and held in the buffer component 712 (e.g., corresponding to buffer storage). The routing component 708 can further forward any DL packets stored in the buffer component 714 to the UE over the new communication link of communication links $108_{1-3}$ until the buffer timer expires. Any data packets remaining in the buffer component 714 after the buffer timer expires can further be discarded. In this manner, the RRP router device 700 can ensure zero packet loss during handover procedure with this connectionless architecture using RRP.

Figure 8:
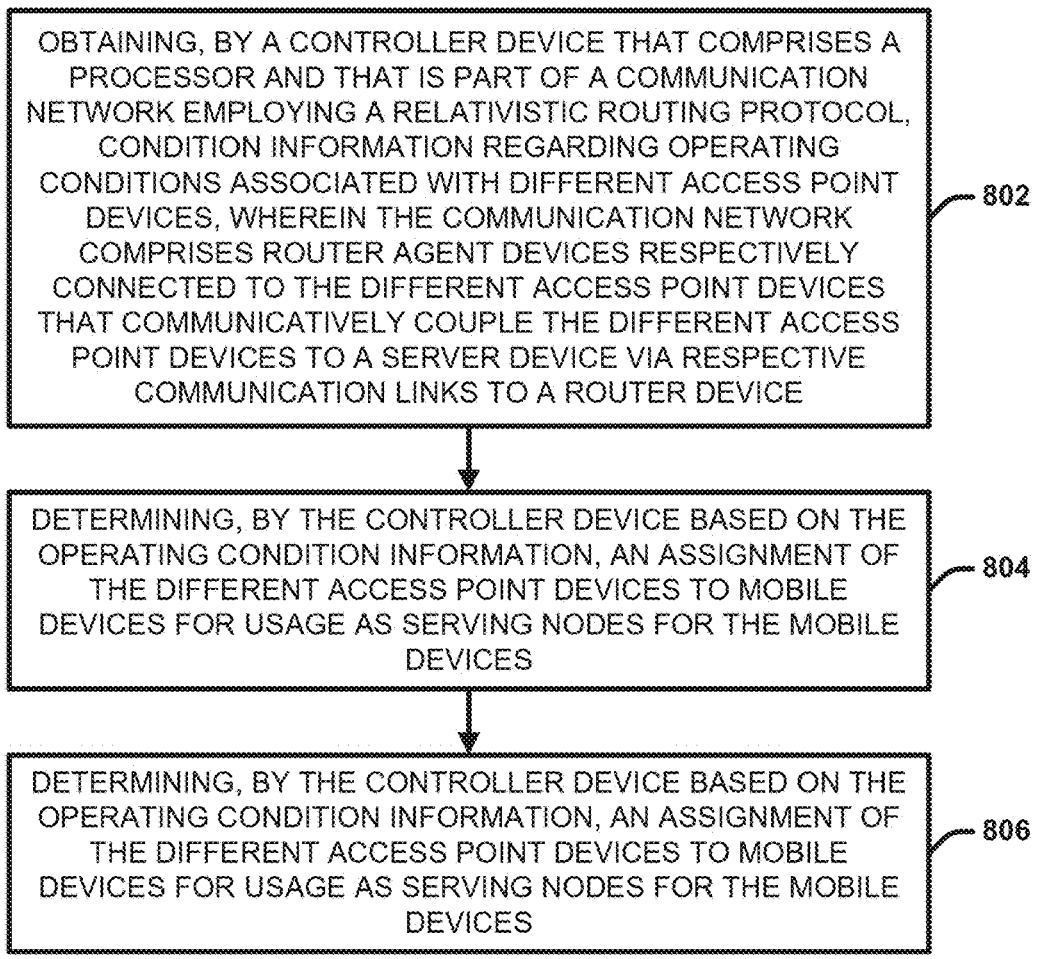
FIG. 8 illustrates a flow chart of an example controller device method that facilitates connectionless mobility management for hybrid networks using RRP, in accordance with various aspects and embodiments of the disclosed subject matter.
Figure 9:
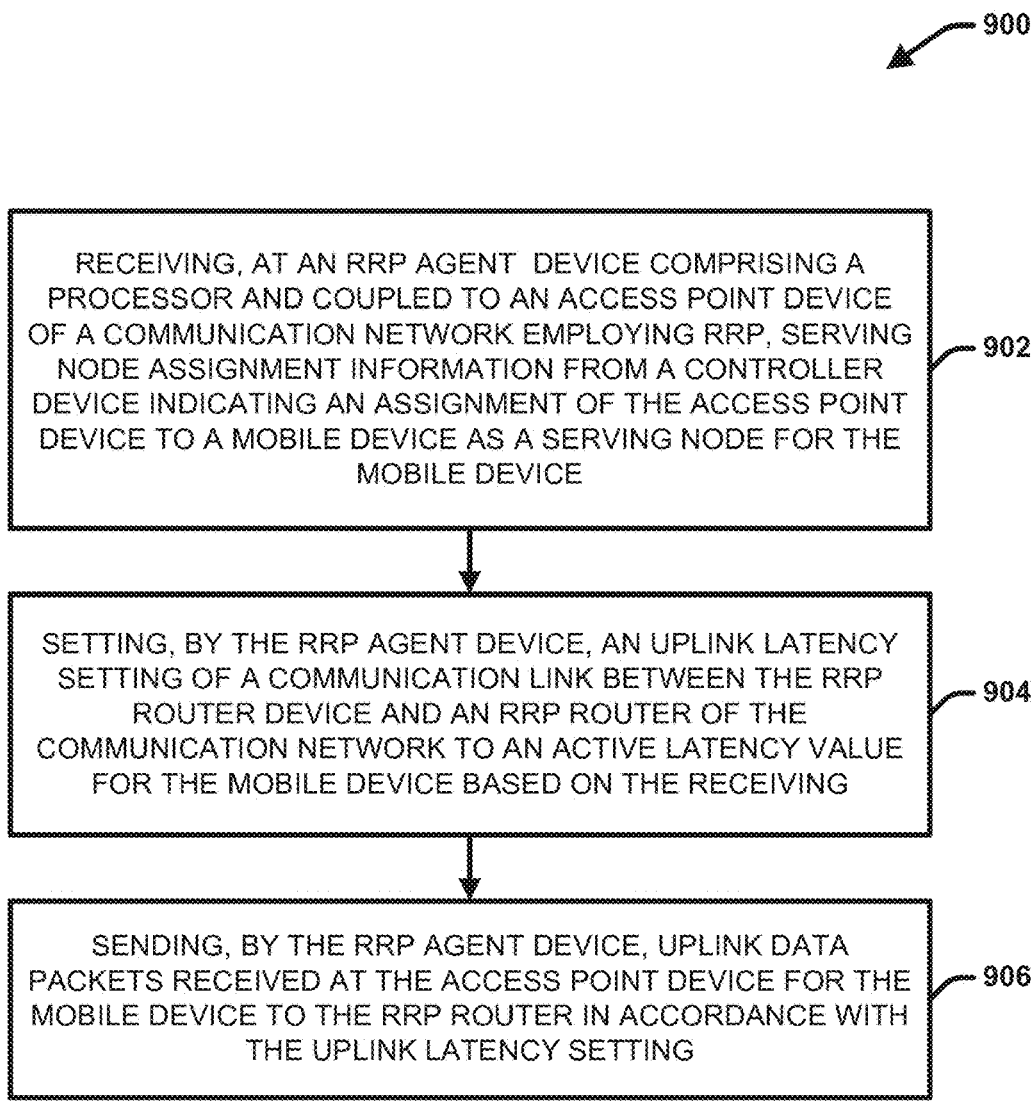
FIG. 9 illustrates a flow chart of an example RRP agent device method that facilitates connectionless mobility management for hybrid networks using RRP, in accordance with various aspects and embodiments of the disclosed subject matter.
Figure 10:
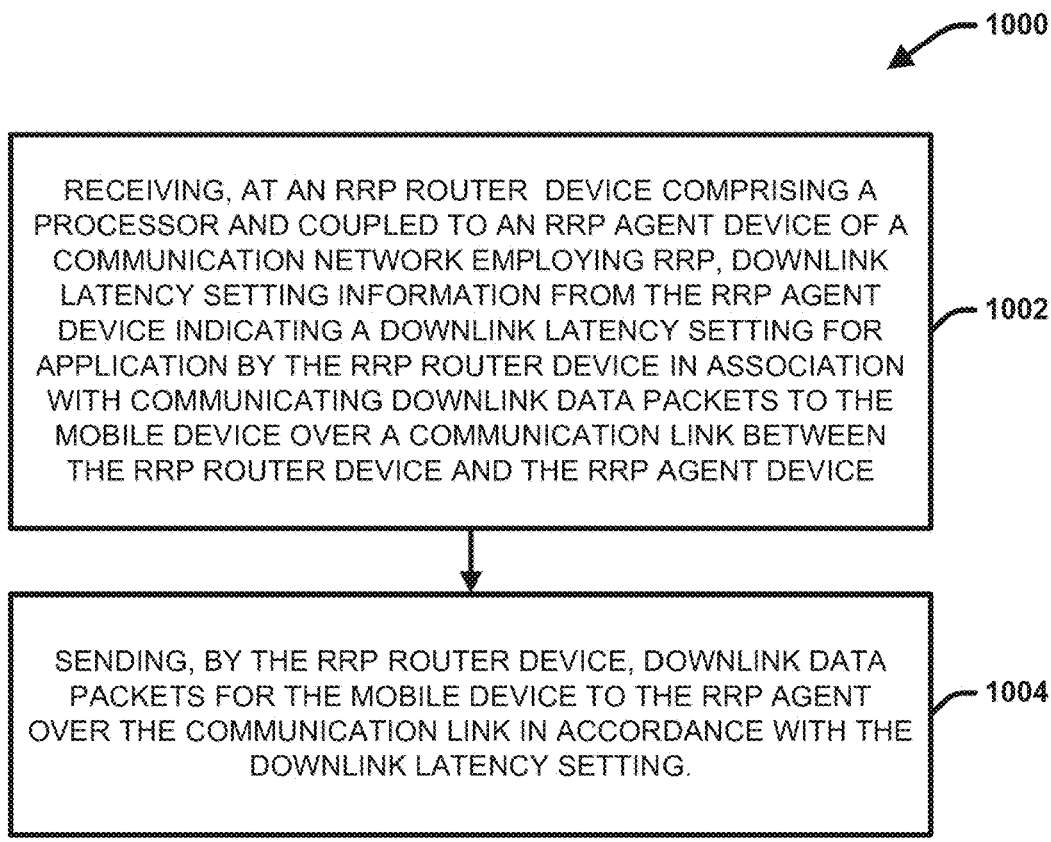
FIG. 10 illustrates a flow chart of an example RRP router device method that facilitates connectionless mobility management for hybrid networks using RRP, in accordance with various aspects and embodiments of the disclosed subject matter.

In view of the example systems and/or devices described herein, example methods that can be implemented in accordance with the disclosed subject matter can be further appreciated with reference to flowcharts in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

FIG. 8 illustrates a flow chart of an example controller device method 800 that facilitates connectionless mobility management for hybrid networks using RRP, in accordance with various aspects and embodiments of the disclosed subject matter. In accordance with method 800, at 802, a controller device (e.g., controller device 122) can receive condition information regarding operating conditions associated with different APs (e.g., APs $102_{1-5}$) that are part of a communication network (e.g., system 100) employing a relativistic routing protocol (RRP), the communication network comprising router agent devices (e.g., RRP agents $106_{1-3}$ and the like) respectively connected to the different access point devices that communicatively couple the different access point devices to a server device (e.g., server device 120) via respective communication links (e.g., communication links $108_{1-3}$ and the like) to a router device (RRP router 112). At 804, the controller device can determine, based on the operating condition information, an assignment of the different access point devices to mobile devices (e.g., UEs) for usage as serving nodes for the mobile devices (e.g., using serving node assignment component 502). At 806, the controller device can control (e.g., via latency setting component 504) setting of latency requirements of the respective communication links for the mobile devices based on the assignment. For example, in various embodiments, at 804, the controller device can identify, based on the condition information a first access point device and a second access point device of the different access point devices to which a mobile device is connected, wherein the first access point device is communicatively coupled to the router device via a first communication link between a first router agent device and the router device, and wherein the second access point device is communicatively coupled to the router device via a second communication link between a second router agent device and the router device router agent device. The controller device can further select either the first access point device or the second access point device as the serving node for the mobile device. Then at 806, the controller device can instruct the first router agent device and the second router agent device to adjust latency settings of the first communication and the second communication link to make them active or inactive for the mobile device based on the selecting.

FIG. 9 illustrates a flow chart of an example RRP agent device method 900 that facilitates connectionless mobility management for hybrid networks using RRP, in accordance with various aspects and embodiments of the disclosed subject matter. In accordance with method 900, at 902, an RRP agent device comprising a processor (e.g., RRP agent device 600) and coupled to an access point device (e.g., one or more of APs $102_{1-5}$ of a communication network employing RRP, serving node assignment information from a controller device indicating an assignment of the access point device to a mobile device (e.g., a UE) as a serving node for the mobile device. At 904, method 900 comprises setting, by the RRP router device, an uplink latency setting of a communication link between the RRP router device and an RRP router of the communication network to an active latency value (e.g., 1 ms or another active value less than a threshold latency value) for the mobile device based on the receiving. At 906, method 900 further comprises sending, by the RRP router device, uplink data packets received at the access point device for the mobile device to the RRP router in accordance with the uplink latency setting.

FIG. 10 illustrates a flow chart of an example RRP router device method 1000 that facilitates connectionless mobility management for hybrid networks using RRP, in accordance with various aspects and embodiments of the disclosed subject matter.

In accordance with method 1000, at 1002, an RRP router device comprising a processor (e.g., RRP router device 700) and coupled to an RRP agent device (e.g., one or more of RRP agents $108_{1-3}$) of a communication network employing RRP, downlink latency setting information from the RRP agent device indicating a downlink latency setting for application by the RRP router device in association with communicating downlink data packets to a mobile device over a communication link between the RRP router device and the RRP agent device. At 1004, method 1000 further comprises sending, by the RRP router device, downlink data packets for the mobile device to the RRP agent over the communication link in accordance with the downlink latency setting.

Figure 11:
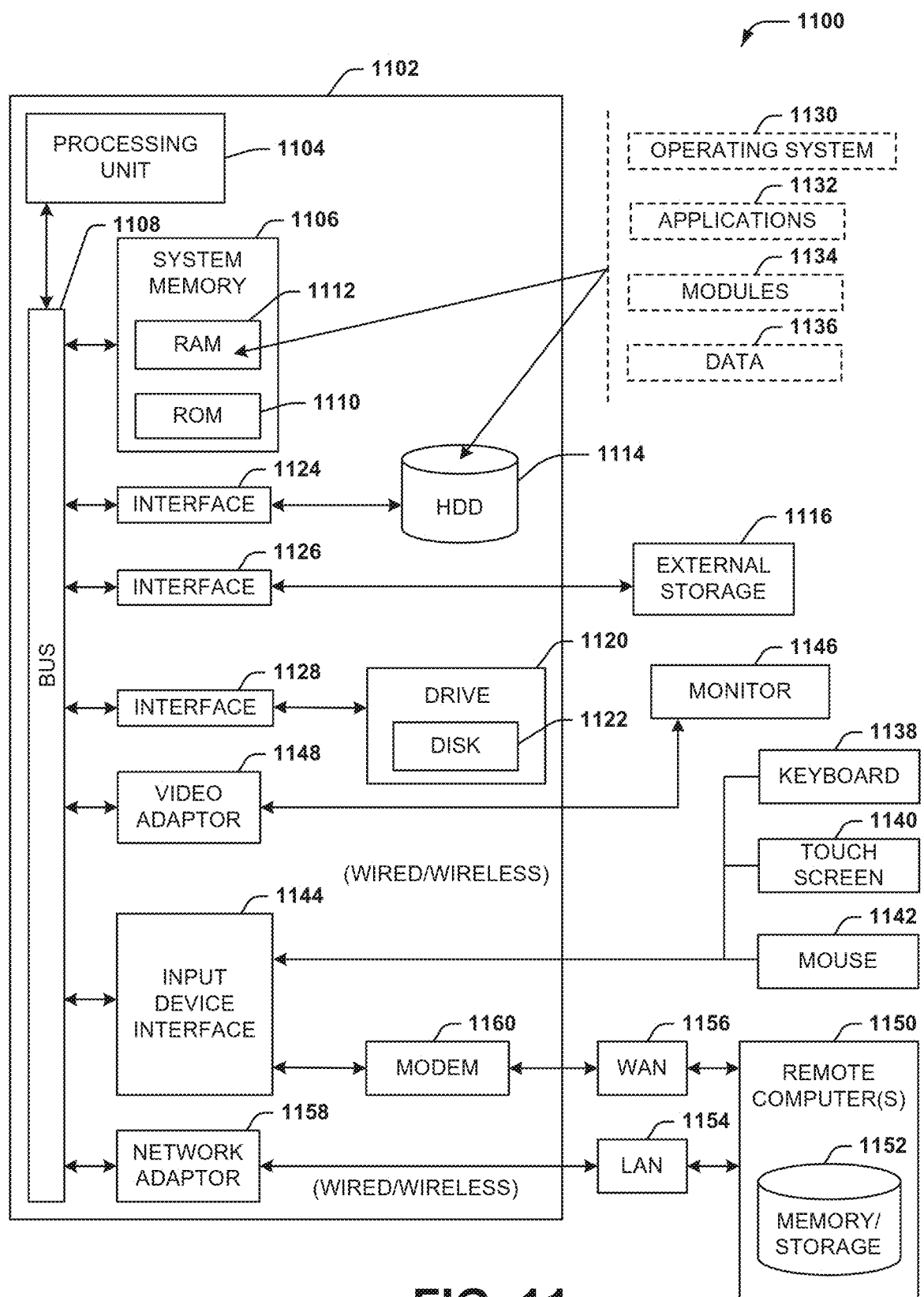
FIG. 11 is a schematic block diagram illustrating a suitable computing environment in which the various embodiments of the embodiments described herein can be implemented.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and a drive 1120, e.g., such as a solid state drive, an optical disk drive, which can read or write from a disk 1122, such as a CD-ROM disc, a DVD, a BD, etc. Alternatively, where a solid state drive is involved, disk 1122 would not be included, unless separate. While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and drive 1120 can be connected to the system bus 1108 by an HDD interface 1124, an external storage interface 1126 and a drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above, such as but not limited to a network virtual machine providing one or more aspects of storage or processing of information. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

What is claimed is:

1. A controller device, comprising:
  a processor; and
  a memory that stores executable instructions that, when executed by the processor, facilitate performance of operations, comprising:
    receiving condition information regarding operating conditions associated with different access point devices that are part of a communication network employing a relativistic routing protocol, the communication network comprising router agent devices respectively connected to the different access point devices that communicatively couple the different access point devices to a server device via respective communication links to a router device;
    determining, based on the operating condition information, an assignment of the different access point devices to mobile devices for usage as serving nodes for the mobile devices; and
    controlling setting of latency requirements of the respective communication links for the mobile devices based on the assignment, wherein the controlling comprises instructing the router agent devices regarding uplink and downlink latency specifications applicable to the respective communication links for the mobile devices based on the assignment.

2. The system of claim 1, wherein the different access point devices comprise different types of access point devices that employ different types of wireless communication technologies.

3. The system of claim 1, wherein the determining comprises identifying, based on the condition information a first access point device and a second access point device of the different access point devices to which a mobile device is connected, wherein the first access point device is communicatively coupled to the router device via a first communication link between a first router agent device and the router device, and wherein the second access point device is communicatively coupled to the router device via a second communication link between a second router agent device and the router device, and selecting either the first access point device or the second access point device as a serving node for the mobile device, and wherein the controlling comprises instructing the first router agent device and the second router agent device to adjust latency settings of the first communication and the second communication link to make them active or inactive for the mobile device based on the selecting.

4. The system of claim 3, wherein the first access point device and the second access point device are of different types that employ different types of wireless communication technologies.

5. The system of claim 1, wherein network devices of the communication network communicate with one another using the relativistic routing protocol, wherein the relativistic routing protocol comprises an Internet Protocol (IP), and wherein the network devices comprise the controller device, the router agent devices, and the router device.

6. The system of claim 1, wherein the condition information comprises at least one of network load information, signal quality information, signal strength information, user equipment location information, user equipment mobility state information, user equipment type information, or user equipment application usage information.

7. The system of claim 1, wherein the controlling comprises directing the router agent devices to decrease a latency requirement of the respective communication links below a threshold latency value to make the respective communication links active based on the assignment.

8. The system of claim 1, wherein the controlling comprises directing the router agent devices to increase a latency requirement of the respective communication links above a threshold latency value to make the respective communication links inactive based on the assignment.

9. The system of claim 1, wherein the condition information comprises network condition information that comprises load information for the different access point devices, connection information identifying devices respectively connected to the different access point devices, and mobile device condition information regarding operating conditions and mobility status of the mobile devices.

10. A method, comprising:
obtaining, by a controller device that comprises a processor and that is part of a communication network employing a relativistic routing protocol, condition information regarding operating conditions associated with different access point devices, wherein the communication network comprises router agent devices respectively connected to the different access point devices that communicatively couple the different access point devices to a server device via respective communication links to a router device;
determining, by the controller device based on the operating condition information, an assignment of the different access point devices to mobile devices for usage as serving nodes for the mobile devices; and
controlling, by the controller device, latency settings of the respective communication links for the mobile devices based on the assignment, wherein the controlling comprises instructing the router agent devices regarding uplink and downlink latency settings of the respective communication links for the mobile devices based on the assignment.

11. The method of claim 10, wherein the different access point devices comprise different types of access point devices that employ different types of wireless communication technologies.

12. The method of claim 10, wherein the determining comprises identifying, based on the condition information a first access point device and a second access point device of the different access point devices to which a mobile device is connected, wherein the first access point device is communicatively coupled to the router device via a first communication link between a first router agent device and the router device, and wherein the second access point device is communicatively coupled to the router device via a second communication link between a second router agent device and the router device, and selecting either the first access point device or the second access point device as a serving node for the mobile device, and wherein the controlling comprises instructing the first router agent device and the second router agent device to adjust latency settings of the first communication and the second communication link to make them active or inactive for the mobile device based on the selecting.

13. The method of claim 12, wherein the first access point device and the second access point device are of different types that employ different types of wireless communication technologies.

14. The method of claim 10, wherein network equipment of the communication network communicate with one another using the relativistic routing protocol, wherein the relativistic routing protocol comprises an Internet Protocol (IP), and wherein the network devices comprise the controller device, the router agent devices, and the router device.

15. The method of claim 10, wherein the condition information comprises at least one of network load information, signal quality information, signal strength information, user equipment location information, user equipment mobility state information, user equipment type information, or user equipment usage information.

16. The method of claim 10, wherein the controlling comprises directing the router agent devices to modify a latency setting of the respective communication links beyond a threshold latency value to cause the respective communication links to become active based on the assignment.

17. The method of claim 10, wherein the controlling comprises directing the router agent devices to modify a latency setting of the respective communication links beyond a threshold latency value to cause the respective communication links to become inactive based on the assignment.

18. A non-transitory machine-readable medium, comprising executable instructions that, when executed by a processor of controller equipment of a communication network employing a relativistic routing protocol, facilitate performance of operations, comprising:
obtaining condition information regarding operating conditions associated with different access point devices, wherein the different access point devices are respectively connected to router agent devices of the communication network that communicatively couple the different access point devices to a server device via respective communication links to a router device of the communication network;
determining, based on the operating condition information, an assignment of the different access point devices to mobile devices for usage as serving nodes for the mobile devices; and
controlling setting of latency settings of the respective communication links for the mobile devices based on the assignment, wherein the controlling comprises instructing the router agent devices regarding uplink and downlink latency settings of the respective communication links for the mobile devices based on the assignment.

19. The non-transitory machine-readable medium of claim 18, wherein the determining comprises identifying, based on the condition information a first access point device and a second access point device of the different access point devices to which a mobile device is connected, wherein the first access point device is communicatively coupled to the router device via a first communication link between a first router agent device and the router device, and wherein the second access point device is communicatively coupled to the router device via a second communication link between a second router agent device and the router device, and selecting either the first access point device or the second access point device as a serving node for the mobile device, and wherein the controlling comprises instructing the first router agent device and the second router agent device to adjust latency settings of the first communication and the second communication link to make them active or inactive for the mobile device based on the selecting.

20. The non-transitory machine-readable medium of claim 19, wherein the first access point device and the second access point device are of different types that employ different types of wireless communication technologies.

\* \* \* \* \*

UNITED STATES PATENT AND TRADEMARK OFFICE
CERTIFICATE OF CORRECTION

PATENT NO. : 12,323,897 B2
APPLICATION NO. : 17/661102
DATED : June 3, 2025
INVENTOR(S) : Zhi Cui et al.

Page 1 of 1

It is certified that error appears in the above-identified patent and that said Letters Patent is hereby corrected as shown below:

In the Claims

Claim 15: Column 32, Line 34, insert --application-- before usage information.

Signed and Sealed this
Eighth Day of July, 2025

Coke Morgan Stewart
*Acting Director of the United States Patent and Trademark Office*